United States Patent
Adjakple et al.

(10) Patent No.: US 12,160,913 B2
(45) Date of Patent: Dec. 3, 2024

(54) METHODS FOR MULTI-SIM UE CONNECTED MODE OPERATION

(71) Applicant: INTERDIGITAL PATENT HOLDINGS, INC., Wilmington, DE (US)

(72) Inventors: Pascal Adjakple, Great Neck, NY (US); Joseph Murray, Schwenksville, PA (US); Michael Starsinic, Newtown, PA (US); Rocco Di Girolamo, Laval (CA); Zhuo Chen, Claymont, DE (US); Quang Ly, North Wales, PA (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 298 days.

(21) Appl. No.: 17/776,654

(22) PCT Filed: Nov. 13, 2020

(86) PCT No.: PCT/US2020/060444
§ 371 (c)(1),
(2) Date: May 13, 2022

(87) PCT Pub. No.: WO2021/097231
PCT Pub. Date: May 20, 2021

(65) Prior Publication Data
US 2022/0418020 A1    Dec. 29, 2022

Related U.S. Application Data

(60) Provisional application No. 62/934,748, filed on Nov. 13, 2019.

(51) Int. Cl.
*H04W 76/15*    (2018.01)
*H04W 8/18*    (2009.01)
(Continued)

(52) U.S. Cl.
CPC .......... *H04W 76/15* (2018.02); *H04W 8/183* (2013.01); *H04W 8/24* (2013.01); *H04W 60/005* (2013.01);
(Continued)

(58) Field of Classification Search
CPC ....... H04W 76/15; H04W 8/183; H04W 8/24; H04W 60/005; H04W 72/1215;
(Continued)

(56) References Cited

U.S. PATENT DOCUMENTS

| | | |
|---|---|---|
| 9,338,713 B2 | 5/2016 | Chakravarthy et al. |
| 2015/0181614 A1 | 6/2015 | Mitra et al. |

(Continued)

FOREIGN PATENT DOCUMENTS

| | | |
|---|---|---|
| CN | 105594270 A | 5/2016 |
| CN | 106559776 A | 4/2017 |
| CN | 107113817 A | 8/2017 |
| EP | 3344000 A1 | 7/2018 |
| WO | 2017/201715 A1 | 11/2017 |

OTHER PUBLICATIONS

"Technical Specification Group Radio Access Network; NR; Medium Access Control (MAC) protocol specification," (Release 15), 3rd Generation Partnership Project, 3GPP TS 38.321 V15.7.0 (Sep. 2019), pp. 76.

(Continued)

*Primary Examiner* — Chae S Lee
(74) *Attorney, Agent, or Firm* — Flaster Greenberg P.C.

(57) ABSTRACT

Methods and apparatuses are described herein for multi-subscriber identification module (SIM) connected mode operation. In one embodiment, a wireless communications device may receive, from an access stratum interface, a request access to the receiver chain during a receiving opportunity. The wireless communications device may determine that the receiver chain is available during the receiving opportunity. The wireless communications device (Continued)

may send a response indicating access is granted to cause the access stratum interface to receive a downlink transmission during the receiving opportunity. The wireless communications device may receive, from the access stratum interface, a second request for a transmitter chain during a transmitting opportunity. The wireless communications device may determine that the transmitter chain is available during the transmitting opportunity. The wireless communications device may send a second response indicating access is granted to enable the access stratum interface to transmit an uplink transmission during the transmitting opportunity.

20 Claims, 33 Drawing Sheets

(51) Int. Cl.
*H04W 8/24* (2009.01)
*H04W 60/00* (2009.01)
*H04W 72/12* (2023.01)
*H04W 76/20* (2018.01)
*H04B 7/0413* (2017.01)

(52) U.S. Cl.
CPC ....... *H04W 72/1215* (2013.01); *H04W 76/20* (2018.02); *H04B 7/0413* (2013.01)

(58) Field of Classification Search
CPC ..... H04W 76/20; H04W 68/00; H04W 76/25; H04W 76/27; H04B 7/0413
See application file for complete search history.

(56) References Cited

U.S. PATENT DOCUMENTS

| 2016/0219608 | A1 | 7/2016 | Awoniyi-Oteri et al. |
| 2017/0290086 | A1 | 10/2017 | Bansal et al. |
| 2018/0077728 | A1* | 3/2018 | Shi .......................... H04W 76/10 |
| 2023/0047213 | A1* | 2/2023 | Chen ....................... H04W 76/27 |

OTHER PUBLICATIONS

"Technical Specification Group Radio Access Network; NR; Multiplexing and channel coding" (Release 15), 3rd Generation Partnership Project, 3GPP TS 38.212 V15.7.0, Sep. 2019, pp. 9.

"Technical Specification Group Radio Access Network; NR; Physical channels and modulation," (Release 15), 3rd Generation Partnership Project, 3GPP TS 38.211 V15.7.0, Sep. 2019, pp. 32.

"Technical Specification Group Radio Access Network; NR; Physical layer measurements," (Release 15), 3rd Generation Partnership Project, 3GPP TS 38.215 V15.5.0, Jun. 2019, pp. 16.

"Technical Specification Group Radio Access Network; NR; Physical layer procedures for control," (Release 15), 3rd Generation Partnership Project, 3GPP TS 38.213 V15.7.0, Sep. 2019, pp. 108.

"Technical Specification Group Radio Access Network; NR; Physical layer procedures for data," (Release 15), 3rd Generation Partnership Project, 3GPP TS 38.214 V15.7.0, Sep. 2019, pp. 106.

3rd Generation Partnership Project; Technical Specification Group Radio Access Network; Evolved Universal Terrestrial Radio Access (E-UTRA); User Equipment (UE) procedures in idle mode (Release 15), 3GPP TS 36.304 V15.4.0, Jun. 2019, pp. 54.

$3^{rd}$ Generation Partnership Project, "Report of phase 1 Multi-SIM email discussion", RP-191898, vivo, 3GPP TSG-RAN WG Meeting #85, Sep. 16-20, 2019, 36 pages.

* cited by examiner

METHODS FOR MULTI-SIM UE CONNECTED MODE OPERATION

CROSS-REFERENCE TO RELATED APPLICATIONS

This application is the National Stage Application of International Patent Application No. PCT/US2020/060444, filed Nov. 13, 2020 which claims the benefit of U.S. Provisional Patent Application No. 62/934,748, filed Nov. 13, 2019, which is hereby incorporated by reference in its entirety.

BACKGROUND

A Multi-SIM UE is a UE with two or more SIMs (Subscriber Identity Module or Services Identity Module). These devices have been increasing in popularity in various locations. However, Multi-SIM operation presents many challenges in terms of UE behaviors which may negatively impact user experience and negatively impact the overall system performance. Accordingly, there is a need for improved procedures for multi-SIM operation.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Methods and apparatuses are described herein for multi-subscriber identification module (SIM) connected mode operation. In accordance with one embodiment, a wireless communications device may receive, from an access stratum interface, a request access to the receiver chain during a receiving opportunity. The wireless communications device may determine that the receiver chain is available during the receiving opportunity. The wireless communications device may send a response indicating access is granted to cause the access stratum interface to receive a downlink transmission during the receiving opportunity. The wireless communications device may receive, from the access stratum interface, a second request for a transmitter chain during a transmitting opportunity. The wireless communications device may determine that the transmitter chain is available during the transmitting opportunity. The wireless communications device may send a second response indicating access is granted to enable the access stratum interface to transmit an uplink transmission during the transmitting opportunity.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. In the drawings:

FIG. 7 shows a Multi-SIM UE Lower AS;

DETAILED DESCRIPTION OF ILLUSTRATIVE EMBODIMENTS

Figure 1:
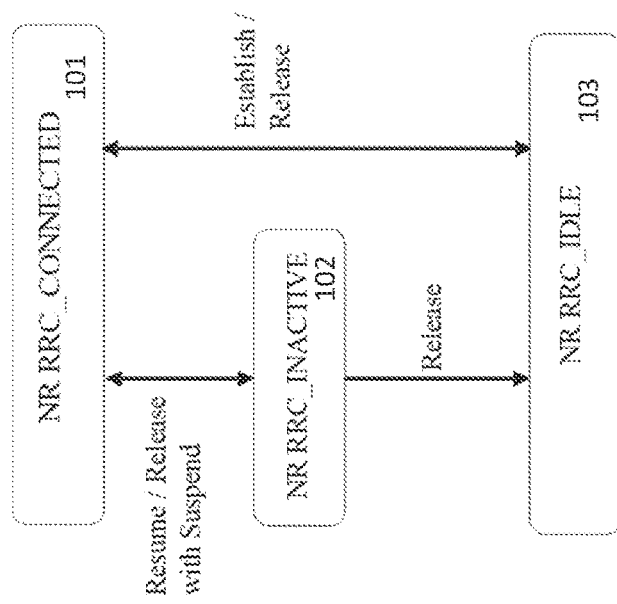
FIG. 1 shows a UE state machine and state transitions in NR.

Methods and apparatuses are described herein for multi-subscriber identification module (SIM) connected mode operation.

The following abbreviations and definitions may be used herein:
3GPP 3<sup>rd</sup> Generation Partnership Project
5G 5th Generation
5GS 5G System
5G-S-TMSI 5G Shortened Temporary Mobile Subscriber Identity
AS Access Stratum
BWP Bandwidth Part
BSR Buffer Status Report
CORESET Control Resource Set
CN Core Network
CM Connection Management
CoMAC Common MAC
CoNAS Common NAS
CoRRC Common RRC
C-RNTI Cell Radio Network Temporary Identifier
CSI Channel State Information
CSI-RS Channel State Information Reference Signal
DCI Downlink Control Information
DSSS Dual SIM Single Standby UE
DSDS Dual SIM Dual Standby
DSDA Dual SIM Dual Active
DeMAC Dedicated MAC
DeNAS Dedicated NAS
DeRRC Dedicated RRC
DRX Discontinuous Reception
ECM EPS Connection Management
eNB Evolved Node B
EPS Evolved Packet System
E-UTRA Evolved UMTS Terrestrial Radio Access
gNB NR NodeB
HARQ Hybrid Automatic Repeat Request
ID Identity or Identifier
LCG Logical Channel Group
LCP Logical Channel Prioritization
LTE Long Term Evolution
MAC Medium Access Control
MAC CE MAC Control Element
MNO Mobile Network Operator
Msg2 Message 2 of the Random Access Procedure
Msg3 Message 3 of the Random Access Procedure
NAS Non AS
NB NodeB
NR New Radio
NTA Timing advance between downlink and uplink
PDCCH Physical Downlink Control Channel
PDCP Packet Data Convergence Protocol
PDU Protocol Data Unit
PHR Power Headroom
PHY PHYsical layer
PLMN Public Land Mobile Network
PRACH Physical Random Access Channel
P-RNTI Paging Radio Network Temporary Identifier
PTAG Primary Timing Advance Group
PUCCH Physical Uplink Control Channel
PUSCH Physical Uplink Shared Channel
QoS Quality of Service
RA-RNTI Random Access Radio Network Temporary Identifier
RAR Random Access Response
RLC Radio Link Control
RRC Radio Resource Control
RTT Round Trip Time
RXOP Receive Opportunities
SDAP Service Data Adaptation Protocol
SDU Service Data Unit
SIM Subscriber Identity Module or Services Identity Module
SCell Secondary Cell
SpCell Special Cell
SDAP Service Data Adaptation Protocol
SI System Information
SPS Semi-Persistent Scheduling
SR Scheduling Request
SRS Sounding Reference Signal
SSB Synchronization Signal Block
STAG Secondary Timing Advance Group
TAG Timing Advance Group
TXOP Transmit Opportunities
RACH Random Access Channel
RAN Radio Access Network
RAT Radio Access Technology
Req Request
RLC Radio Link Control
RNTI Radio Network Temporary Identifier
RRC Radio Resource Control
Rsp Response
RSU Road Side Unit
RX Receiver or Receiving
RXOP RX Opportunity
TDM Time Division Multiplexing
TX Transmitter or Transmitting
TXOP TX Opportunity
UCI Uplink Control Information
UE User Equipment
UL Uplink
UL-SCH Uplink Shared Channel
UMTS Universal Mobile Telecommunications System
USIM Universal SIM
Uu Interface connecting UE to RAN
V2X Vehicle-to-X Communication A Multi-SIM UE is a UE with two or more SIMs. A Dual-SIM UE is a UE with two SIMs. The term Multi-SIM and Dual-SIM may be used interchangeably herein. Multi-USIM devices have been more and more popular in different countries. The user may have both a personal and a business subscription in one device or has two personal subscriptions in one device for different services (e.g. use one individual subscription and one "family circle" plan). However, support for multi-USIM within a device is currently handled in an implementation-specific manner without any support from 3GPP specifications, resulting in a variety of implementations and UE behaviors (e.g. Passive Dual SIM, Dual SIM Single Standby, Dual SIM Dual Standby, Dual SIM Dual Active, etc.). Such situation may cause increased complexity for UE vendors, unexpected UE behavior for network vendors or operators, and degraded user experience.

The following terms are defined herein:

Passive Dual SIM: the device contains two SIMs, but only one can be selected for use at any given time, with the assumption that both SIMs share a single transceiver. While this implementation may be attractive in terms device complexity or unexpected UE behavior for network vendors or operators, it doesn't fulfil the promise of Dual SIM devices to allow the user of being reachable or available at any given time over two networks or to allow the user to perform concurrent communications over two networks which might belong to the same or different operators.

Dual SIM Single Standby UE (DSSS): while actively communicating with the first system, the UE needs to occasionally check the other system (e.g. to read the paging channel, perform measurements, or read the system information). This occasional activity on the second system may or may not have any performance impact, depending on the UE implementation, i.e., single Rx or dual Rx.

Dual SIM Dual Standby (DSDS): both SIMs can be used for idle-mode network connection, but when a radio connection is active the second connection is disabled. As in the passive case, the SIMs in a DSDS device share a single transceiver. Through time multiplexing two radio connections are maintained in idle mode. When in-call on network for one SIM, although registration to the second network is maintained, it is no longer possible to maintain radio connection to the network of the second SIM, hence that connection is unavailable for the duration of the call.

Dual SIM Dual Active (DSDA): both SIMs can be used in both idle and connected modes, for example, one communication may be for voice service another communication may be for data service. It is usually assumed each SIM has a dedicated transceiver, meaning that there are no interdependencies on idle or connected mode operation at the modem level. But even for this case, concurrent communication with two systems present challenges that may impact the UE performance and the network performance, some of those challenges include the UE power control and capability coordination so the power budget and capability budget of Multi-SIM devices are not exceeded.

Serving SIM: A SIM that has been selected for use by the UE for either idle mode operation or connected mode operation. Hereinafter, the term serving SIM and SIM may be used interchangeably.

Serving RAN: A RAN serving the UE for either idle mode operation or connected mode operation. A serving RAN is associated with a serving SIM.

Serving PLMN: A PLMN serving the UE for either idle mode operation or connected mode operation. A serving PLMN is associated with a serving SIM.

Serving network: A network serving the UE for either idle mode operation or connected mode operation. A serving network is associated with a serving SIM. A network may be in reference to a RAN or a PLMN or a combination thereof The term Time Domain Multiplexing (TDM) of UE capabilities or UE Capabilities Multiplexing in Time Domain refers to the sharing of the said UE capabilities between the serving networks in support of idle mode operation or connection operation in the said serving networks wherein the idle mode operation or connected mode operation may take place concurrently. Examples of UE capabilities to be time domain multiplexed may include transmitter, receiver, transmission power budget, etc.

Multi-SIM Use Cases and Deployment Scenarios are described herein. It should be noted that these are just provided as an illustration and are not meant to limit in anyway, the applicability of the solutions described herein.

Use Case 1: A user is traveling abroad from the United States to Asia and has a UE that supports multiple USIM cards. For cost reduction purposes, the UE is implemented with common radio and baseband components in which the USIMs share access. As a result, only one USIM can be active at any one time. The user purchases a USIM upon arrival for access to cellular services while traveling within the destination country. The travel USIM card may provide services for local voice, text, and high speed data while the home USIM card is mostly used to provide voice and text that the user may want to receive while traveling.

Use Case 2: Another prominent use case that takes advantage of multiple USIMs centers around a user who has both business and personal subscription services and wants to use both services on the same device. The user has a corporate issued UE with subscription services for USIM 1 with operator 1 while the user also has a personal subscription service for USIM 2 with operator 2. The user wants to be able to receive voice calls from either service and access data services according to the subscriptions to either USIM 1 or USIM 2 depending on the time of day or on the application that is using the service.

Multi-SIM deployment scenarios may include one more of the following deployment scenarios in terms of each of the following subsystems.

Core Network: a) both SIM in 5GS; b) both SIMs in EPS; c) SIM A in 5GS and SIM B in EPS. d) SIM A and SIM B belongs to the same operator (Intra-MNO case); e) SIM A and SIM B belongs to two different operators (Inter-MNO case).

Radio Access Network (RAN): a) SIM A in LTE and SIM B in LTE; b) SIM A in LTE and SIM B in NR; c) SIM A in NR and SIM B in NR.

UE Capability: a) single RX and single TX; b) dual RX and single TX; c) dual RX and dual TX AS State combination: a): LTE IDLE and NR IDLE or INACTIVE; b): LTE CONNECTED and NR IDLE or INACTIVE; c): LTE IDLE and NR CONNECTED; d) LTE CONNECTED and NR CONNECTED; e): NR IDLE or INACTIVE and NR IDLE or INACTIVE; f): NR CONNECTED, and NR CONNECTED; g): NR IDLE or INACTIVE and NR CONNECTED; h): LTE IDLE and LTE IDLE; i): LTE CONNECTED, and LTE CONNECTED; j): LTE IDLE and LTE CONNECTED.

FIG. 1 shows an example UE state machine and state transitions in NR 100. The example of FIG. 1 shows transitioning to/from the NR RRC_CONNECTED state 101 to/from the NR RRC_INACTIVE state 102 during a resume/release with suspend and transitioning to/from the NR RRC_CONNECTED state 101 to/from the NR RRC_IDLE state 103 during an establish/release. Transitioning to/from the NR RRC_INACTIVE state 102 to/from the NR RRC_IDLE state 103 during a release is also shown.

Figure 2:
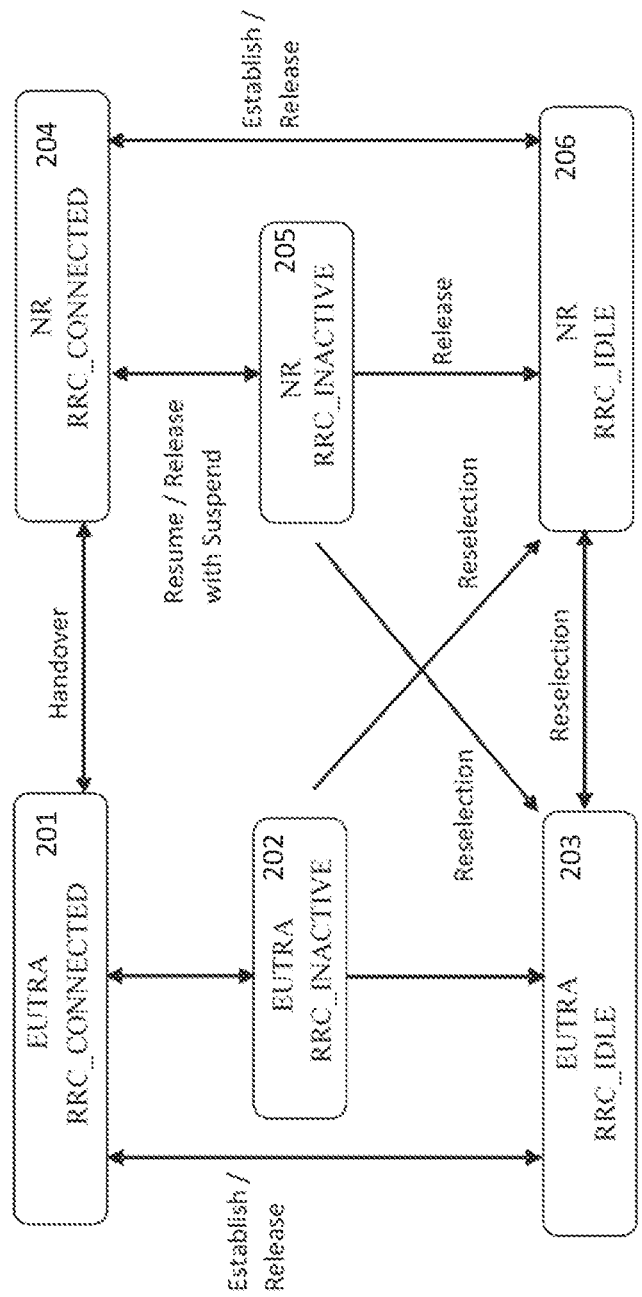
FIG. 2 shows a UE state machine and state transitions between NR/5GC, E-UTRA/EPC and E-UTRA/5GC.

FIG. 2 shows an example UE state machine and state transitions between NR/5GC, E-UTRA/EPC and E-UTRA/5GC 200. The example of FIG. 2 shows transitioning to/from the EUTRA RRC_CONNECTED state 201 to/from the EUTRA RRC_INACTIVE state 202 and transitioning to/from the EUTRA RRC_CONNECTED state 201 to/from the EUTRA RRC_IDLE state 203 during an establish/release. Transitioning to/from the EUTRA RRC_INACTIVE state 202 to/from the EUTRA RRC_IDLE state 203 during a release is also shown.

Transitioning to/from the NR RRC_CONNECTED state 204 to/from the NR RRC_INACTIVE state 205 and transitioning to/from the NR RRC_CONNECTED state 204 to/from the NR RRC_IDLE state 206 during an establish/release. Transitioning to/from the NR RRC_INACTIVE state 205 to/from the NR RRC_IDLE state 206 during a release is also shown.

Transitioning from the EUTRA RRC_INACTIVE state 202 to the NR RRC_IDLE state 206 during a reselection is also shown. Transitioning from the NR RRC_INACTIVE state 205 to the EUTRA RRC_IDLE state 206 during a reselection is also shown. Transitioning to/from the EUTRA RRC_IDLE state 203 to/from the NR RRC_IDLE state 206 during a reselection is also shown.

UE Registration Management (RM) is described herein. The UE performs a registration when initially registering to the network, as a result of certain mobility events, or at the expiration of certain timers (i.e. Periodic Registration Update timer or non-3GPP Deregistration timer).

The UE's RM states comprise RM-DEREGISTERED and RM-REGISTERED. The UE and network maintain a separate RM state for each RAT (i.e. 3GPP and non-3GPP).

In the RM-DEREGISTERED state: The UE is not reachable. AMF may be caching some UE context. The UE leaves this state by initiating the Initial Registration Procedure.

In the RM-REGISTERED state: The UE performs Registration Updates upon mobility and timer expiration. UE or AMF may perform a De-Registration Procedure at any time. AMF may perform implicit De-Registration at timer expiration.

UE Connection Management (CM) generally refers to the state of the UE's NAS connection with the AMF. The UE and network may maintain a separate CM state for each RAT (i.e. 3GPP and non-3GPP).

The UE's Registration Management (CM) states are CM-IDLE and CM-CONNECTED. The UE and network may maintain a separate CM state for each RAT (i.e. 3GPP and non-3GPP).

In the CM-IDLE state: No NAS signaling connection established with the AMF over N1

In the CM-CONNECTED state: the UE has a NAS connection. This requires an RRC connection in NG-RAN. UE may be RRC-Inactive; in which case reachability is managed by RAN. The UE may return to the CM-IDLE state when its AN signaling connection is released.

As noted above, Dual-SIM or Multi-SIM operation presents many challenges in terms of UE behaviors which, if not addressed through specification, may negatively impact user experience and negatively impact the overall system performance. This methods and apparatuses described herein address Multi-SIM operation issues such as:

Issue 1: Enhancement to UE AS Protocol Architecture:

In order to minimize processing overhead and power consumption, there is a need for enhancements to UE protocol architecture (e.g. AS) and state machines. For example, most of the idle mode procedures for example cell (re)selection and camping just to name few would benefit from coordination in order to reduce UE processing overhead and power consumption, particularly in the case of Multi-SIM intra-MNO deployment scenario.

Issue 2: Potential Collision of UL Transmissions from Two RATs:

This issue deals with the specification impacts due to the Time Domain Multiplexing (TDM) of UE capabilities such as transmitter chain(s) capabilities to maintain concurrent Uplink communications with two PLMNs. For example, considering Multi-SIM devices with single RX and single TX or Dual RX and single TX, procedures to enable TDM use of the single TX chain allowing for suspension (or release) and resumption of an ongoing connection in the 3GPP system associated with USIM A, so that the UE can temporarily access the 3GPP system associated with USIM B need to be investigated. Associated UE behaviors including HARQ timing handling as a result of UL transmission gaps and handling of UE timers such as MAC timers and RRC timers also need to be investigated. This issue should be understood in the context of inter-PLMN operation with Multi-SIM deployment scenarios highlighted herein covering the listed CN deployment scenarios, the listed RAN deployment scenarios, and the listed connected mode related AS state combinations.

Issue 3: Potential Collision of DL Data Receptions, e.g. Both RATs are in CONNECTED:

The issue deals with the specification impacts due to the Time Domain Multiplexing (TDM) of receiver chain(s) to maintain concurrent downlink communications with two PLMNs. For example, considering Multi-SIM devices with single RX and single TX or single RX and dual TX, procedures to enable TDM use of the single RX chain allowing for suspension (or release) and resumption of an ongoing connection in the 3GPP system associated with USIM A, so that the UE can temporarily access the 3GPP system associated with USIM B need to be investigated. Associated UE behaviors including HARQ timing handling as a result of DL reception gaps and handling of UE timers such as MAC timers and RRC timers also need to be investigated. This issue should be understood in the context of inter-PLMN operation with Multi-SIM deployment scenarios highlighted herein covering the listed CN deployment scenarios, the listed RAN deployment scenarios, and the listed connected mode related AS state combinations.

Figure 3:
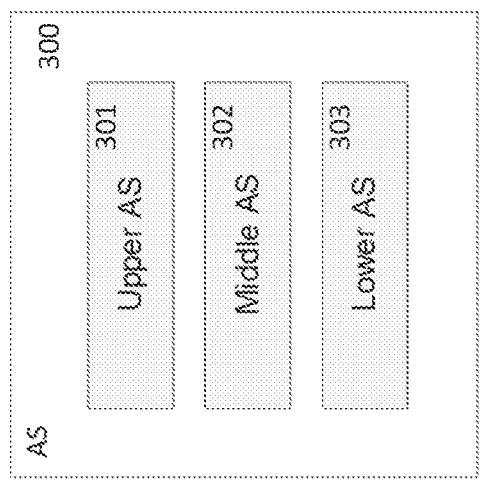
FIG. 3 shows a Multi-Sim UE AS Model.

FIG. 3 shows an example Access Stratum (AS) protocol 300. In accordance with one embodiment, the AS protocol of a Multi-SIM UE may comprise an upper AS layer 301, a middle AS layer 302, and a lower AS layer 303. In the control plane, the upper AS layer 301 may implement RRC functions. The lower AS layer 303 may implement functions of the MAC layer and the PHY layer. The lower AS layer may 303 further include a Common MAC (CoMAC) for the UE and a Dedicated MAC (DeMAC) per serving SIM (i.e. for the serving network associated to each serving SIM). The CoMAC may assist the DeMAC entities, may arbitrate their actions, and may implement logic for efficient coordination across serving networks associated with the serving SIMs, for example, the logic for time domain multiplexing of UE capabilities such as transceivers or power budgets across the serving networks associated with the serving SIMs of the UE.

The NAS may include an upper NAS and a lower NAS wherein the upper NAS may include a Common NAS (CoNAS) for the UE and a set of Dedicated NAS (DeNAS) entities with a DeNAS per serving SIM (i.e. for the serving network associated to each serving SIM). CoNAS may assist the DeNAS entities and may coordinate their actions so as to ensure an efficient operation of the UE, for example, in order to minimize the UE processing overhead, power consumption, and for an efficient overall system performance.

New UE level state machines versus SIM level state machines are also proposed for both the RRC layer and the NAS layer.

AS Procedures to Enable TDM Sharing of an RX/TX Chain are described herein. Methods are described herein to perform dynamic sharing of an RX/TX chain that are based on making requests to an RX/TX Chain Arbiter, where access may be granted on a first-come-first serve basis, USIM identity, or the priority of the service for which access is being requested.

Methods are described herein to perform semi-static sharing of an RX/TX chain that are based on suspending or releasing an RRC connection, wherein each SIM is associated with a dedicated RRC (DeRRC) layer and a Common RRC (CoRRC) layer may determine which DeRRC should be active at a given time.

Methods are described herein to perform a Random Access Procedure that take the effects of sharing an RX/TX chain in to consideration including:

Mechanisms for performing Random Access Resource Selection following a failure to access the RX/TX chain;

Mechanisms to adapt the starting of the RAR window that are conditioned on obtaining access to the RX chain for the duration of the ra-ResponseWindow; and Mechanisms to adapt the starting of the contention resolution window that are conditioned on obtaining access to the RX chain for the duration of ra-ContentionResolutionTimer.

Methods are described herein to perform sharing of an RX/TX chain that are based on adapting MAC counters and timers in response to lost RXOPs/TXOPs including:

Mechanisms to control the setting of prohibit timers and incrementing of transmission counters in response to lost TXOPs; and Mechanisms to pause or extend timers used to control DL monitoring in response to lost RXOPs.

Figure 4:
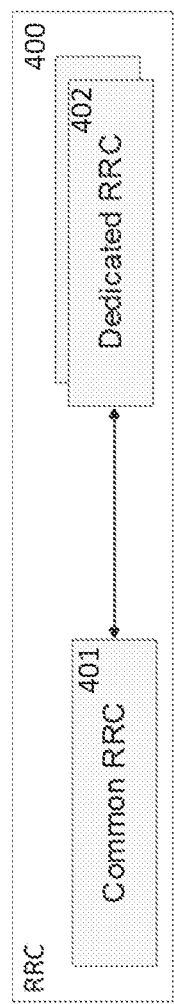
FIG. 4 shows a Multi-SIM UE RRC.

FIG. 4 shows the RRC 400. The RRC may comprise a Common RRC (CoRRC) entity 401 and a set of Dedicated RRC (DeRRC) entity 402, with one DeRRC entity per serving SIM (i.e. for the serving network associated to each serving SIM). The CoRRC 401 may assist the DeRRC 402 entities and may coordinate/arbitrate their actions so as to ensure an efficient operation of the UE, for example, in order to minimize the UE processing overhead, power consumption, and for an efficient overall system performance including use of radio resources. The CoRRC 401 may implement logic for efficient coordination across serving networks associated with the serving SIMs, for example, the logic for time domain multiplexing of UE capabilities such as transceivers or power budgets across the serving networks associated with the serving SIMs of the UE.

In one embodiment, the CoRRC entity 401 within the UE may implement the multiplexing function of or one or more shared capabilities of the UE's, for e.g. shared transmitter, shared receiver, shared transceiver, shared power budget, shared common amplifiers or any other transmission and/or reception common hardware.

In another embodiment, the CoRRC entity 401 may assist other entities either in the UE or in the network, for example entities in the lower layer AS, in the multiplexing of one or more capabilities of the UE, shared between the serving networks associated with the UE's SIMs. The DeRRC may implement RRC protocol architecture as per the legacy system for e.g. in support of carrier aggregation or multi-connectivity within the serving networks associated with the same SIM. For example, in case of Multi-connectivity in a serving network for a given SIM, the DeRRC associated with this serving network may be configured in multiple instances with one instance for each cell group for e.g. master cell group versus secondary cell group.

The CoRRC entity 401 may implement one or more functions of RRC IDLE state, RRC INACTIVE state, or RRC CONNECTED state. Similarly, the DeRRC may implement one or more functions of RRC IDLE state, RRC INACTIVE state, or RRC CONNECTED state. In one embodiment, the CoRRC may implement the RRC IDLE or RRC INACTIVE functions, while the DeRRC may implement the RRC CONNECTED functions, with the CoRRC ensuring coordination between the DeRRC entities and multiplexing of the shared capabilities of the UE across the independent networks, for an efficient operation of the UE operations for example in order to minimize the UE processing overhead, power consumption. The CoRRC may implement logic that reflects the overall RRC state of the UE, as opposed to the state with respect to the serving networks associated with each of the SIM in the UE.

In the user plane, the upper layer may exist or may not exist. For example, in one embodiment where the AS Upper layer exists in the user plane, this upper layer may implement the SDAP functions.

Figure 5:
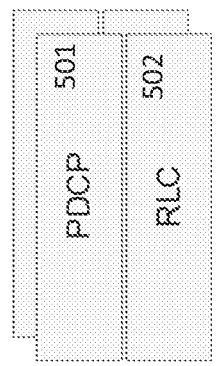
FIG. 5 shows a Multi-SIM UE Middle AS in C-Plane.

FIG. 5 shows a Multi-SIM UE Middle AS in C-Plane 500. The example of FIG. 5 shows that, in the control plane, the Middle AS may implement the functions of PDCP layer 501 and RLC layer 502. The RLC 502 and PDCP 501 may be dedicated per serving SIM.

Figure 6:
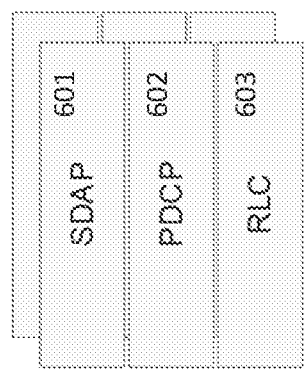
FIG. 6 shows a Multi-SIM UE Middle AS in U-Plane.

FIG. 6 shows a Multi-SIM UE Middle AS in U-Plane 600. The example of FIG. 6 shows that, in the user plane, the Middle AS may implement the functions of SDAP layer 601, the PDCP layer 602, and RLC layer 603. The SDAP 601, the RLC 602, and the PDCP 603 may be dedicated per serving network associated to each SIM.

Figure 7:
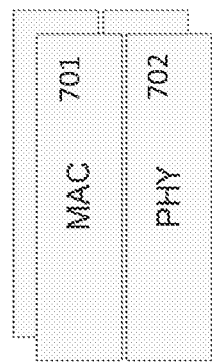

FIG. 7 shows a Multi-SIM UE Lower AS 700. FIG. 7 shows that the lower AS may implement the functions of the MAC layer 701 and the PHY layer 702.

Figure 8:
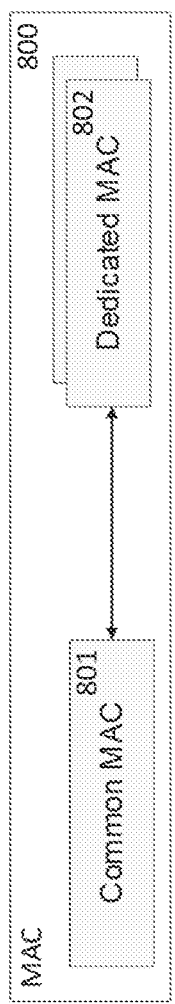
FIG. 8 shows a Multi-SIM MAC.

FIG. 8 shows a Multi-SIM MAC 800. FIG. 8 shows that the MAC may include a Common MAC (CoMAC) entity 801 and a set of Dedicated MAC (DeMAC) entity 802, with one DeMAC entity per serving SIM.

The CoMAC 801 may assist the DeMAC 802 entities and may coordinate their actions so as to ensure an efficient operation of the UE, for example, in order to minimize the UE processing overhead, power consumption and an efficient overall system performance including use of radio resources. In one embodiment, the CoMAC entity within the UE may implement the multiplexing function of or one or more shared capabilities of the UE's, for e.g. shared transmitter, shared receiver, shared transceiver, shared power budget, shared common amplifiers or any other transmission and/or reception common hardware. In another embodiment, the CoMAC entity may assist other entities either in the UE or in the network, for example entities in the upper layer AS, in the multiplexing of one or more capabilities of the UE, shared between the serving networks associated with the UE's SIMS. The DeMAC may implement MAC protocol architecture as per the legacy system for e.g. in support of carrier aggregation or multi-connectivity within the serving networks associated with the same SIM. For example, in case of Multi-connectivity in a serving network for a given SIM, the DeMAC associated with this serving network may be configured in multiple instances with one instance for each cell group for e.g. master cell group versus secondary cell group.

Figure 9:
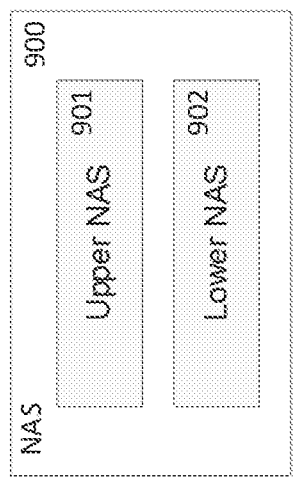
FIG. 9 shows a Multi-SIM NAS—example 1.

FIG. 9 shows an example Multi-SIM NAS 900. FIG. 9 shows that the Non-Access Stratum (NAS) protocol of a Multi-SIM UE may be modeled to include an upper NAS 901 and a lower NAS 902.

Figure 10:
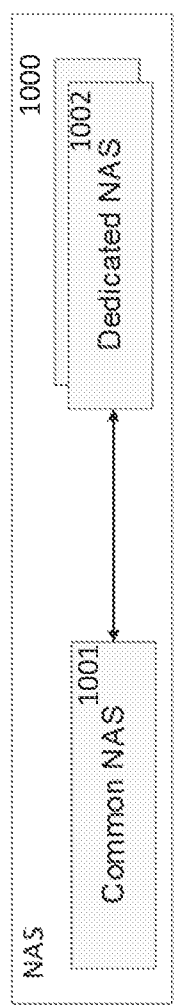
FIG. 10 shows a Multi-SIM NAS—example 2.

FIG. 10 shows another example Multi-SIM NAS 1000. In this example, the NAS may include a Common NAS (CoNAS) 1001 and a set of Dedicated NAS (DeNAS) entities 1002., with one DeNAS entity per serving SIM.

Figure 11:
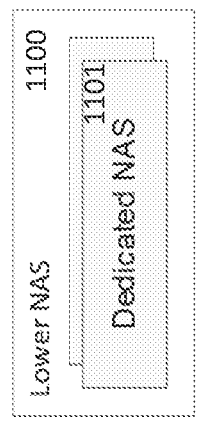
FIG. 11 shows a Multi-SIM Upper NAS.

FIG. 11 shows a Multi-SIM Upper NAS 1100. The upper NAS 1100 comprises the CoNAS 1101.

Figure 12:
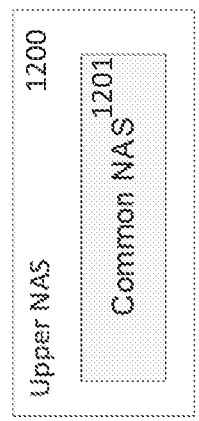
FIG. 12 shows a Multi-SIM Lower NAS.

FIG. 12 shows a Multi-SIM Lower NAS 1200. The lower NAS 1200 comprises DeNAS entities 1201.

The CoNAS may assist the DeNAS entities and coordinates their actions so as to ensure an efficient operation of the UE, for example in order to minimize the UE processing overhead, power consumption and an efficient overall system performance. In one embodiment, the CoNAS entity within the UE may implement the multiplexing function of one or more shared capabilities of the UE's, for e.g. number of concurrent communication sessions within the UE. In another embodiment, the CoNAS entity may assist other entities either in the UE or in the network, for example entities in the lower NAS or in the AS, in the multiplexing of one or more capabilities of the UE, shared between the serving networks associated with the UE's SIMs. The DeNAS may implement NAS protocol architecture as per the legacy system for e.g. in support of 3GPP AS and non-3GPP access for each of the serving networks associated with the UE's SIMs. The CoNAS may handle or assist the coordination of the handling of the user preferences for e.g. prioritization of services between the serving networks associated with the SIMs in the UE.

The CoNAS may implement or assist in the implementation of one or more functions of NAS IDLE state (e.g. CM IDLE or ECM IDLE), or one or more function NAS CONNECTED state (e.g. CM CONNECTED or ECM CONNECTED). Similarly, the DeNAS may implement one or more functions of NAS IDLE state, or NAS CONNECTED state. For example in one embodiment, the CoNAS may implement or assist in the implementation of functions such as PLMN selection, or UE Reachability in NAS IDLE state. Similarly, the CoNAS may implement or assist in the implementation of policy coordination and UE reachability when the UE is in NAS CONNECTED state with respect to some of the serving networks associated with a SIM within the UE. The CoNAS may implement logic that reflects the overall NAS state of the UE, as opposed to state with respect to the serving networks associated with each of the SIM in the UE.

In one embodiment, a DeNAS entity may be associated with each if the UE's SIMs. A DeNAS entity may maintain one or more Registration Management (RM) States (e.g. an RM state for 3GPP access and an RM state for non-3GPP access). A DeNAS entity may also maintain one or more Connection Management (CM) States (e.g. a CM state for 3GPP access and a CM state for non-3GPP access). As stated above, the CoNAS may implement logic that reflects the overall NAS state of the UE on each of the UE's available RATs. Furthermore, the CoNAS state machines may be driven by requests and indications that are received from the DeNAS entities in the Lower NAS. The CoNAS state machines and how its state transitions are further described below. The CoNAS entity may maintain a separate state for each of the UE's available RATs (i.e. non-3GPP and 3GPP). Note that a separate state may be maintained for each transceiver. In other words, if the UE includes two 3GPP transceivers, then the UE may maintain a CoNAS state for each transceiver.

Figure 13:
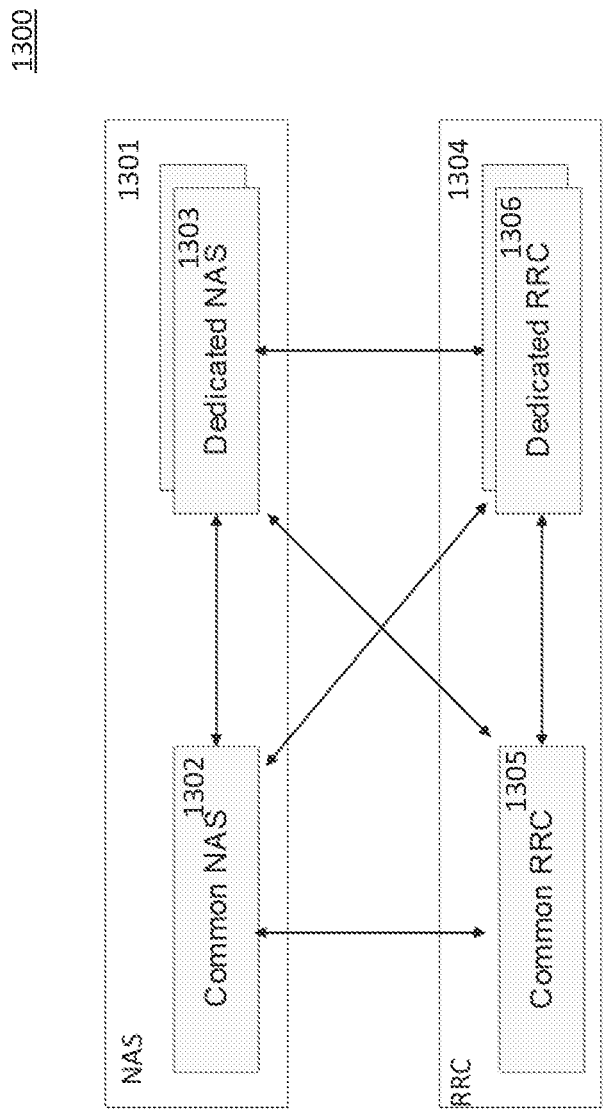
FIG. 13 shows a Multi-SIM UE Control Plane Architecture.

FIG. 13 shows a high level view of the NAS and AS protocol stack in the UE 1300. The NAS 1301 may comprise a common NAS 1302 and dedicated NAS 1303. The RRC 1304 may comprise a common RRC 1305 and a dedicated RRC 1304.

Figure 14:
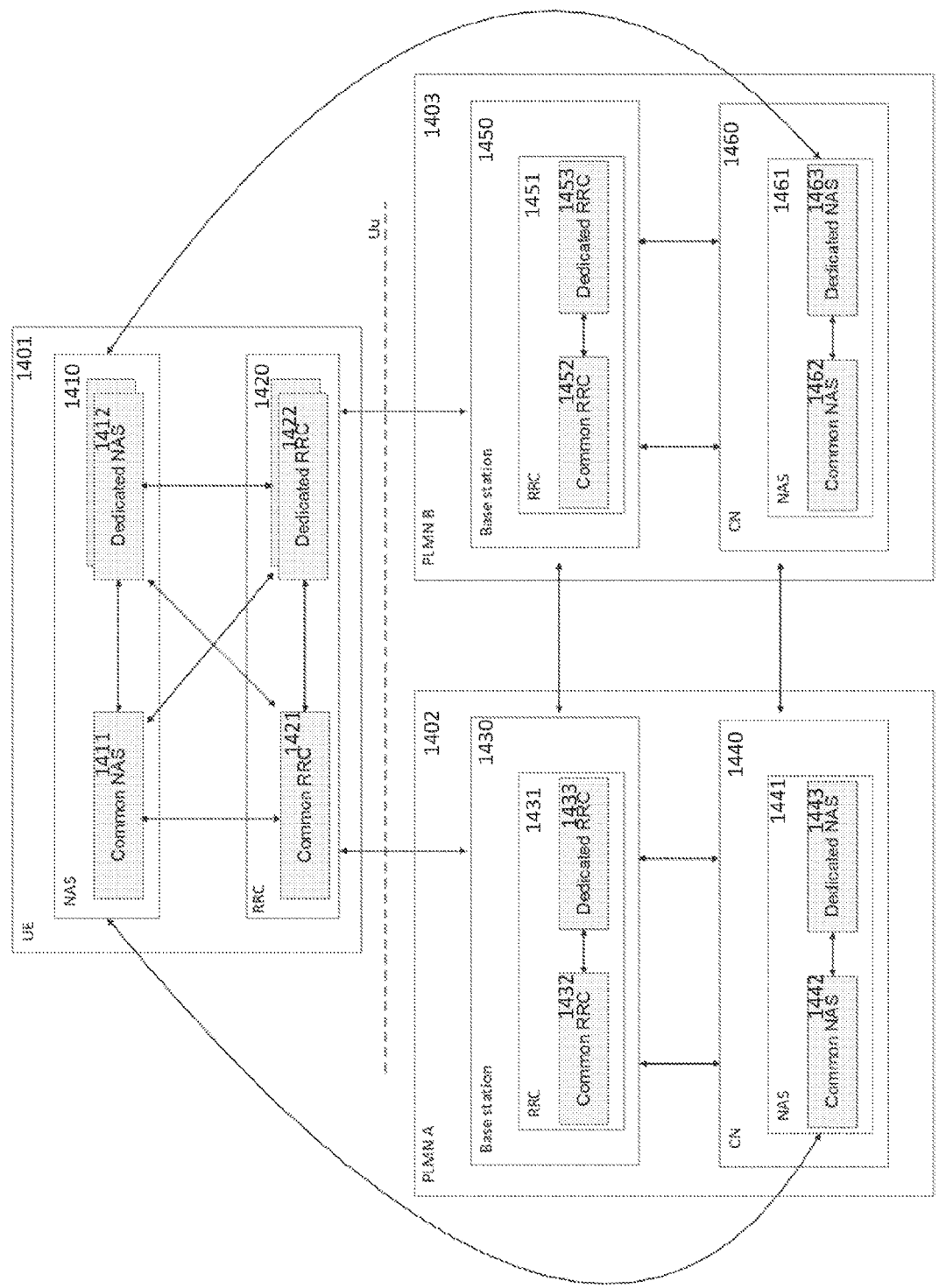
FIG. 14 shows a High Level End-to-End Control plane Architecture in Support of Multi-SIM UEs.

FIG. 14 shows a high level illustration of a UE versus the network NAS and AS protocol stack 1400. The example of FIG. 14 shows that the UE 1401 may comprise a NAS 1410 that comprises a common NAS 1411 and a dedicated NAS 1410. The UE 1401 may comprise an RRC 1420 that comprises a common RRC 1421 and a dedicated RRC 1420.

The example of FIG. 14 also shows two PLMNs, PLMN A 1402 and PLMN B 1403. PLMN A 1402 may comprise a base station 1430 comprising an RRC 1431 that comprises a common RRC 1432 and a dedicated RRC 1433. PLMN A 1402 may comprise a CN 1440 comprising a NAS 1441 that comprises a common NAS 1442 and a dedicated NAS 1443.

PLMN B 1403 may comprise a base station 1450 comprising an RRC 1451 that comprises a common RRC 1452 and a dedicated RRC 1453. PLMN B 1403 may comprise a CN 1460 comprising a NAS 1461 that comprises a common NAS 1462 and a dedicated NAS 1463.

It should be noted that the use of the Multi-SIM UE control plane architecture as depicted in FIG. 13 does not require that the network implement a similar architecture for example with the split of common NAS versus dedicated NAS or the split of common RRC versus dedicated RRC as illustrated in FIG. 14.

An RRC State Machine is described herein. An RRC state may be described in relation with a serving SIM or equivalently in relation with the serving network associated with serving SIM. Such an RRC state may be denoted as a SIM level RRC state (i.e. an RRC state within the scope of serving SIM). Similarly, an RRC state may be described in relation with the UE as whole, i.e. as a combination of individual serving SIM level RRC states. Such an RRC state may be denoted as a UE level RRC state.

Figure 15:
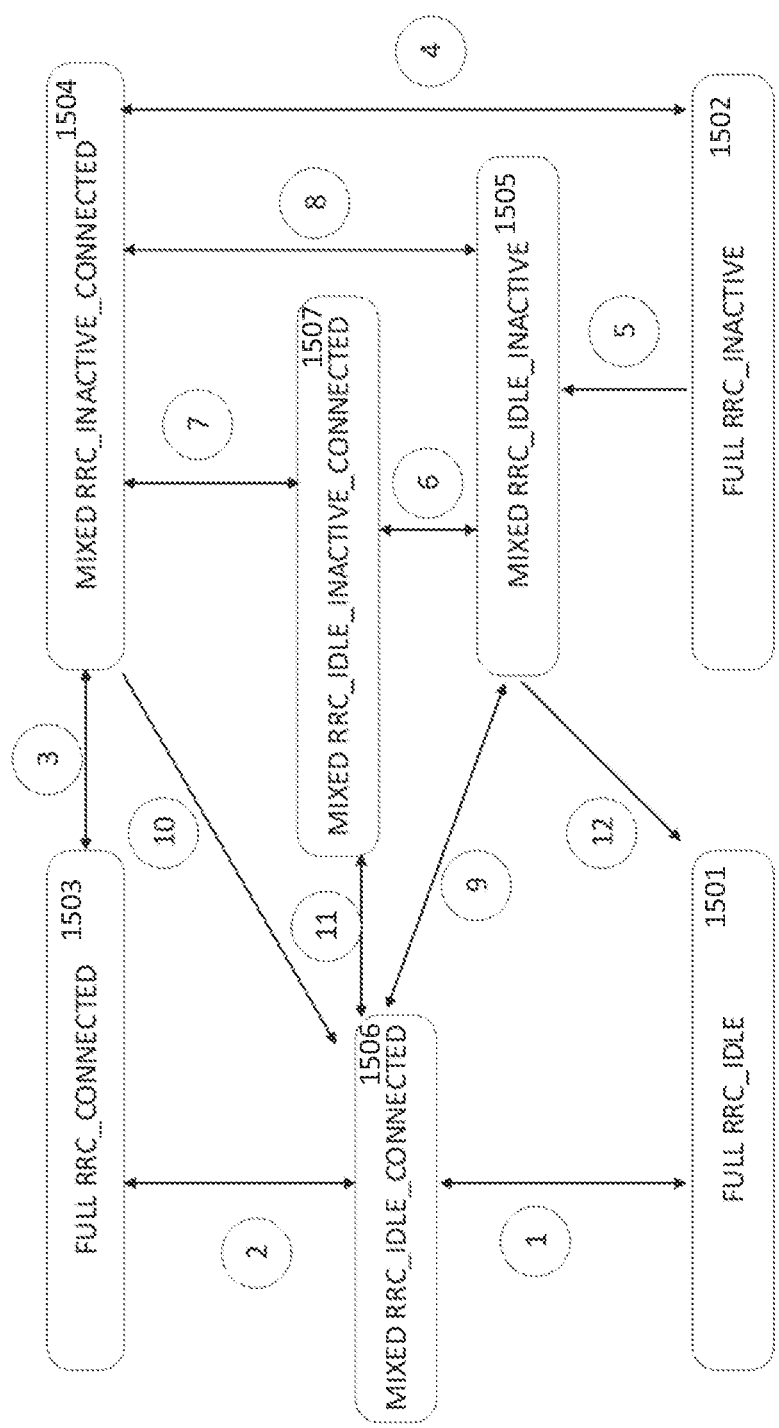
FIG. 15 shows a Multi-SIM UE Level RRC State Machine.

FIG. 15 shows an example RRC state machine 1500. The example of FIG. 15 shows a UE level overall RRC state machine, wherein the RRC architecture is as depicted in FIG. 4. Each of the RRC states captured in FIG. 15 may be in reference to CoRRC or DeRRC as depicted in FIG. 4. The RRC state machine for Multi-SIM UEs may be designed to reduce any increase in power consumption and avoid shortening of the UE battery life as a result of a Multi-SIM mode of operation. It is proposed to introduce a Multi-SIM power saving mode of operation. Multi-SIM mode UEs may be designed to operate in Multi-SIM power saving mode or may be designed to operate in such a mode based on the UE configuration (e.g. via GUI), UE capability or user preference. The UE may exchange signaling with the network to determine if it may operate in Multi-SIM power saving mode.

UE level RRC states are described as follows:

FULL RRC IDLE 1501: In this state, the UE may be in a SIM level RRC IDLE state for each of the SIMs within the UE, i.e. for each of the SIMs in the UE or alternatively for each of the SIMs in the UE selected for use, the UE has performed a PLMN selection and camped on a cell but has no RRC connection in any of the cells the UE has camped on. Note hereinafter, the term "SIMs in the UE" or "SIMs in the UE selected for use" or "serving SIMs" may be used interchangeably. The UE may transition from this state into MIXED RRC IDLE CONNECTED 1506 state. For example, when the UE transition to SIM level RRC CONNECTED for one of the SIM in the UE, the UE transitions from FULL RRC IDLE 1501 into MIXED RRC IDLE CONNECTED 1506 state. In FULL RRC IDLE state 1501, the UE may perform "reduced power" idle mode operation such as "reduced power" support for PLMN selection, "reduced power" cell reselection and "reduced power" cell camping. The term "reduced power" and the term "Multi-SIM power saving" mode may be used interchangeably herein. In addition to the reduced power operation, the FULL_RRC_IDLE state 1501 may further be described as follows:

A SIM specific DRX may be configured by upper layers. Additionally, a UE specific DRX may be configured by upper layers. In this case, the UE may provide the SIM specific DRX or the UE specific DRX to the network.

UE controlled mobility based on network configuration, or reduced power UE controlled mobility based on UE capability, user preference and network configuration;

The UE for each serving SIM may perform the following:
  Maintain at least one P-RNTI for each of the serving network associated with SIMs in the UE. Additionally, the UE may maintain a common P-RNTI across the serving networks, regardless of the SIM the serving network is associated with;
  Monitor Short Messages transmitted with P-RNTI over DCI;

Maintain at least one 5G-S-TMSI i.e. at least one 5G-S-TMSI for each of the serving network associated with SIMs in the UE;

Monitors a Paging channel for CN paging using 5G-S-TMSI Monitoring of paging may be performed using Multi-SIM non-power saving mode or Multi-SIM power saving mode;

Perform neighboring cell measurements and cell (re-)selection as needed taking into account the UE operation and SIM level state with respect to other SIM; Cell measurement and cell (re-)selection may be performed using Multi-SIM non-power saving mode or Multi-SIM power saving mode; and Acquire system information and can send SI request (if configured). Acquisition of system information or transmission of SI request may be performed using Multi-SIM non-power saving mode or Multi-SIM power saving mode.

FULL RRC INACTIVE 1502: In this state, the UE is in a SIM level RRC INACTIVE state for each of the SIMs in the UE. In FULL RRC_INACTICE state 1502, the UE may perform "reduced power" idle mode operation such as "reduced power" support for PLMN selection, "reduced power" cell reselection and "reduced power" cell camping. In addition to the reduced power operation, the FULL_RC_INACTIVE state 1502 can further be described as follows:

A SIM specific DRX may be configured by upper layers; Additionally, a UE specific DRX may be configured by upper layers. In this case, the UE may provide the SIM specific DRX or the UE specific DRX to the network.

UE controlled mobility based on network configuration, or reduced power UE controlled mobility based on UE capability, user preference and network configuration;

The UE stores the dedicated UE Inactive AS context and the common UE Inactive AS context i.e. the context in relation to both DeRRC and CoRRC.

For each serving SIM or serving network, a RAN-based notification area is configured by RRC layer, The UE for each serving SIM may perform the following:

Maintain at least one P-RNTI for each of the serving network associated with SIMs in the UE. Additionally, the UE may maintain a common P-RNTI across the serving networks for example in RAN sharing case, regardless of the SIM the serving network is associated with;

Monitor Short Messages transmitted with P-RNTI over DCI;

Maintain at least one 5G-S-TMSI i.e. at least one 5G-S-TMSI for each of the serving network associated with SIMs in the UE;

Monitor a Paging channel for CN paging using 5G-S-TMSI, in either; Monitoring of paging may be performed using Multi-SIM non-power saving mode or Multi-SIM power saving mode.

Perform neighboring cell measurements and cell (re-)selection; Cell measurement and cell (re-)selection may be performed using Multi-SIM non-power saving mode or Multi-SIM power saving mode;

Performs RAN-based notification area updates periodically and when moving outside the configured RAN-based notification area. RAN-based notification area update may be performed using Multi-SIM non-power saving mode or Multi-SIM power saving mode; and Acquire system information and can send SI request (if configured). Acquisition of system information or transmission of SI request may be performed using Multi-SIM non-power saving mode or Multi-SIM power saving mode.

The UE may transition from this state into MIXED_RRC_INACTIVE_CONNECTED 1504 or MIXED_RRC_IDLE_INACTIVE 1505. It is noted that for the remaining of this document, a UE level state transition is described in terms of one SIM level state transition at a time.

Transition to MIXED_RRC_INACTIVE_CONNECTED 1504: the UE may transition into this state from FULL_RRC_INACTIVE 1502 when the UE transitions to SIM level RRC_CONNECTED for one of the SIM in the UE.

Transition to MIXED_RRC_IDLE_INACTIVE 1505: the UE may transition into this state from FULL_RRC_INACTIVE 1502 when the UE transitions to SIM level RRC_IDLE for one of the SIM in the UE.

FULL RRC CONNECTED 1503: In this state, the UE is in a SIM level RRC_CONNECTED state for each of the SIMs within the UE. In this state, the UE stores the dedicated AS contexts and a common AS context, wherein the common AS context relates to context information across the serving networks associated with the SIMs within the UE. The UE may transition from this state into MIXED_RRC_IDLE_CONNECTED state 1506 or MIXED_RRC_INACTIVE_CONNECTED state 1504.

Transition to MIXED_RRC_IDLE_CONNECTED state 1506: the UE may transition into this state from FULL_RRC_CONNECTED state 1503 when the UE transitions to SIM level RRC_IDLE for one of the SIM in the UE. The UE may perform RRC_IDLE mode procedures specific to Multi-SIM power saving mode or Multi-SIM non-power saving mode, for example based on network configuration, or UE preference settings.

Transition to MIXED_RRC_INACTIVE_CONNECTED state 1504: the UE may transition into this state from FULL_RRC_CONNECTED state 1503 when the UE transitions to SIM level RRC_INACTIVE for one of the SIM in the UE. The UE may perform RRC_INACTIVE mode procedures specific to Multi-SIM power saving mode or Multi-SIM non-power saving mode, for example based on network configuration, or UE preference settings.

MIXED RRC IDLE_CONNECTED 1506: In this state, the UE is in a SIM level RRC_IDLE state for one or more SIM and in a SIM level RRC_CONNECTED state for one or more SIM, and no SIM in the UE is in RRC_INACTIVE state. For the SIMs in RRC_IDLE state, the UE may perform RRC_IDLE mode procedures specific to Multi-SIM power saving mode or Multi-SIM non-power saving mode, for example based on network configuration, or UE preference settings as described in this document. The UE may transition from this state into FULL_RRC_CONNECTED state 1503, FULL_RRC_IDLE state 1501, MIXED RRC_IDLE_INACTIVE state 1505, or MIXED_RRC_IDLE_INACTIVE_CONNECTED state 1507.

Transition to FULL_RRC_CONNECTED state 1503: the UE may transition to this state from MIXED_RRC_IDLE_CONNECTED state 1506 when the UE transitions to SIM level RRC_CONNECTED for the only SIM for which the UE was in SIM level RRC_IDLE state.

Transition to FULL_RRC_IDLE state 1501: the UE may transition to this state from MIXED_RRC_IDLE_CONNECTED state 1506 when the UE transitions to SIM level RRC_IDLE for the only SIM for which the UE was in SIM level RRC_CONNECTED.

Transition to MIXED RRC_IDLE_INACTIVE state 1505: the UE may transition to this state from MIXED_RR- C_IDLE_CONNECTED state 1506 when the UE transitions to SIM level RRC_INACTIVE state for the only SIM for which the UE was in SIM level RRC_CONNECTED state.

Transition to MIXED_RRC_IDLE_INACTIVE_CONNECTED state 1507: the UE may transition to this state from MIXED_RRC_IDLE_CONNECTED state 1506 when the UE transitions to SIM level RRC_INACTIVE state for one of the SIM for which the UE was in SIM level RRC_CONNECTED state.

MIXED_RRC_INACTIVE_CONNECTED 1504: In this state, the UE is in a SIM level RRC_INACTIVE state for one or more SIM and in a SIM level RRC_CONNECTED state for one or more SIM, and no SIM is in RRC_IDLE state. For the SIMs in RRC_INACTIVE state, the UE may perform RRC_INACTIVE mode procedures specific to Multi-SIM power saving mode or Multi-SIM non-power saving mode, for example based on network configuration, or UE preference settings as described in this document. The UE may transition from this state into FULL_RRC_CONNECTED state 1503, FULL_RRC_INACTIVE state 1502, MIXED_RRC_IDLE_INACTIVE state 1505, MIXED_RRC_IDLE_CONNECTED state 1506, or MIXED_RRC_IDLE_INACTIVE_CONNECTED state 1507.

Transition to FULL_RRC_CONNECTED state 1503: the UE may transition to this state from MIXED_RRC_INACTIVE_CONNECTED state 1504 when the UE transitions to SIM level RRC_CONNECTED state for the only SIM for which the UE was in SIM level RRC_INACTIVE state.

Transition to FULL_RRC_INACTIVE state 1502: the UE may transition to this state from MIXED_RRC_INACTIVE_CONNECTED state 1504 when the UE transitions to SIM level RRC_INACTIVE state for the only SIM for which the UE was in SIM level RRC_CONNECTED state.

Transition to MIXED_RRC_IDLE_INACTIVE state 1505: the UE may transition to this state from MIXED_RRC_INACTIVE_CONNECTED state 1504 when the UE transitions to SIM level RRC_INACTIVE state for the only SIM for which the UE was in SIM level RRC_CONNECTED state.

Transition to MIXED_RRC_IDLE_CONNECTED state 1506: the UE may transition to this state from MIXED_RRC_INACTIVE_CONNECTED state 1504 when the UE transitions to SIM level RRC_IDLE state for the only SIM for which the UE was in SIM level RRC_INACTIVE state.

Transition to MIXED_RRC_IDLE_INACTIVE_CONNECTED state 1507: the UE may transition to this state from MIXED_RRC_INACTIVE_CONNECTED state 1504 when the UE transitions to SIM level RRC_IDLE state for one of the SIMs for which the UE was in SIM level RRC_CONNECTED state, or for one of the SIMs for which the UE was in RRC_INACTIVE state.

MIXED_RRC_IDLE_INACTIVE 1505: In this state, the UE is in a SIM level RRC_IDLE state for one or more SIM and in a SIM level RRC_INACTIVE state for one or more SIM, and no SIM is in RRC_CONNECTED state. The UE may perform RRC_IDLE mode procedures or RRC_INACTIVE mode procedures specific to Multi-SIM power saving mode or Multi-SIM non-power saving mode, for example based on network configuration, or UE preference settings as described in this document. The UE may transition from this state into FULL_RRC_IDLE state 1501, MIXED_RRC_IDLE_CONNECTED state 1506, MIXED RRC_INACTIVE_CONNECTED 1507, or MIXED_RRC_IDLE_INACTIVE_CONNECTED state.

Transition to FULL_RRC_IDLE state 1501: the UE may transition to this state from MIXED RRC_IDLE INACTIVE state 1505 when the UE transitions to SIM level RRC_IDLE state for the only SIM for which the UE was in SIM level RRC_INACTIVE state.

Transition to MIXED_RRC_IDLE_CONNECTED state 1506: the UE may transition to this state from MIXED RRC_IDLE INACTIVE state 1505 when the UE transitions to SIM level RRC_CONNECTED state for the only SIM for which the UE was in SIM level RRC_INACTIVE state.

Transition to MIXED_RRC_INACTIVE_CONNECTED state 1504: the UE may transition to this state from MIXED_RRC_IDLE_INACTIVE state 1505 when the UE transitions to SIM level RRC_CONNECTED state for the only SIM for which the UE was in SIM level RRC_IDLE state.

Transition to MIXED_RRC_IDLE_INACTIVE_CONNECTED state 1507: the UE may transition to this state from MIXED_RRC_IDLE_INACTIVE state 1505 when the UE transitions to SIM level RRC_CONNECTED state for one of the SIMs for which the UE was in SIM level RRC_INACTIVE state or for one of the SIM for which the UE was in SIM level RRC_IDLE state.

MIXED RRC_IDLE_INACTIVE_CONNECTED state 1507: In this state, the UE is in a SIM level RRC_IDLE state for one or more SIM, in a SIM level RRC_INACTIVE state for one or more SIM, and in SIM level RRC_CONNECTED state for one or more SIM. The UE may perform RRC_IDLE mode procedures or RRC_INACTIVE mode procedures specific to Multi-SIM power saving mode or Multi-SIM non-power saving mode, for example based on network configuration, or UE preference settings as described in this document. The UE may transition from this state into one of the mixed RRC states described above. For example, the UE may transition from this state into MIXED RRC_INACTIVE_CONNECTED state 1504, MIXED_RRC_IDLE_CONNECTED state 1506, or MIXED RRC_IDLE_INACTIVE state 1505.

Transition to MIXED RRC_INACTIVE_CONNECTED state 1504: the UE may transition to this state from MIXED_RRC_IDLE_INACTIVE_CONNECTED state 1507 when the UE transitions to SIM level RRC_CONNECTED state for the only SIM for which the UE was in SIM level RRC_IDLE state.

Transition to MIXED RRC_IDLE_CONNECTED state 1506: the UE may transition to this state from MIXED_RRC_IDLE_INACTIVE_CONNECTED state 1507 when the UE transitions to SIM level RRC_CONNECTED state for the only SIM for which the UE was in SIM level RRC_INACTIVE state, or when the UE transitions to SIM level RRC_IDLE state for the only SIM for which the UE was in SIM level RRC_INACTIVE.

Transition to MIXED RRC_IDLE_INACTIVE state 1505: the UE may transition to this state from MIXED_RRC_IDLE_INACTIVE_CONNECTED state 1507 when the UE transitions to SIM level RRC_INACTIVE state for the only SIM for which the UE was in SIM level RRC_CONNECTED state, or when the UE transitions to SIM level RRC_IDLE state for the only SIM for which the UE was in SIM level RRC_CONNECTED, or when the UE transitions to SIM level RRC_IDLE state for the only SIM for which the UE was in SIM level RRC_CONNECTED.

Figure 16:
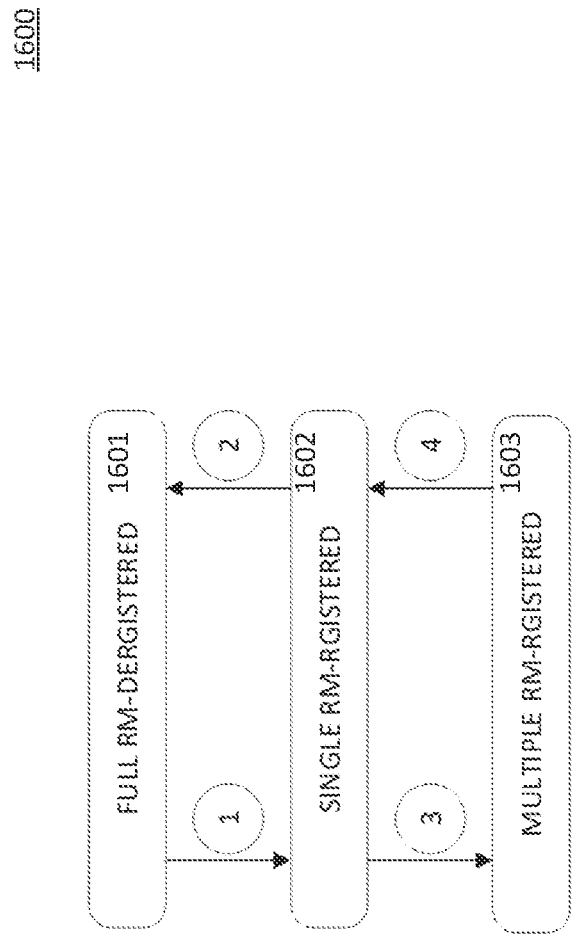
FIG. 16 shows a Multi-SIM UE Level NAS State Machine.

FIG. 16 shows a UE level CoNAS state machine 1600. The CoNAS state machine for Multi-SIM UEs may be designed to reduce any increase in power consumption and avoid shortening of the UE battery life as a result of Multi-SIM mode of operation. The CoNAS state machine may have a FULL RM-DEREGISTERED 1601, a SINGLE RM-REGISTERED 1602, and a MULTIPLE RM-REGISTERED state 1603. The states may be generally differentiated, or characterized, by the amount of arbitration that the CoNAS entity needs to perform between the DeNAS entities. The arbitration that is performed by the CoNAS entity relates to when each DeNAS entity is permitted to use a transceiver to send or receive NAS signaling. One CoNAS state machine may be maintained by the CoNAS for each transceiver.

Power Saving Mode (PSM) and Extended Idle Mode DRX parameters can be suggested by the UE, to the network in the Registration procedure. DeNAS entities may provide the values the CoNAS entity before they are provided to the network and the CoNAS may propose new values or approve the values. For example, the CoNAS entity may propose a longer Periodic Registration Timer, or shortened active timer, in order to make it more likely that the DeNAS state may be CM-IDLE for a longer period of time. Alternatively, the CoNAS entity may propose timers that are better aligned with the timer of other DeNAS entities in order to avoid situations when DeNAS entities request to perform functionality at the same time.

The states of CoNAS state machine are described below. As stated above, these states relate to a single RAT (i.e. non-3GPP or 3GPP).

FULL RM-DEREGISTERED 1601: In this state, all of the RM states of all the DeNAS entities are RM-DEREGISTERED for the associated RAT (i.e. 3GPP or non-3GPP). The FULL RM-DEREGISTERED state may be further characterized as follows:

While in this state, the CoNAS entity may receive a request from any DeNAS entity for permission to send a Registration request on the associated RAT. The CoNAS entity may typically grant this request since the RM state of no other DeNAS state machines are currently RM-REGISTERED for the associated RAT; thus no arbitration of NAS functionality is needed.

The CoNAS entity may transition to the SINGLE RM-REGISTERED state 1602 when it receives an indication from a DeNAS entity that it is now RM-REGISTERED on the associated RAT. This transition shown in step 1 of FIG. 16.

SINGLE RM-REGISTERED 1602: In this state, the RM state of only one DeNAS entity is RM-REGISTERED on the associated RAT (i.e. 3GPP or non-3GPP); the rest are RM-DEREGISTERED on the associated RAT. In this state, the CoNAS entity does not need to perform any arbitration functions until an RM state machine that is associated with a second DeNAS entity indicates that it desires to initiate a registration on the associated RAT. The SINGLE RM-REGISTERED state 1602 may be further characterized as follows:

While in this state, the CoNAS entity may receive a request from the DeNAS entity, that is RM-REGISTERED on the associated RAT, for permission to send a NAS message request (e.g. mobility Registration Update, periodic Registration Update, Service Request, or UE Configuration Update). The CoNAS entity may typically grant this request since the RM state of no other DeNAS state machines are currently RM-REGISTERED with the associated RAT; thus no arbitration of NAS functionality is needed.

While in this state, the CoNAS entity may receive requests from a DeNAS entity, whose RM states is RM-DEREGISTERED on the associated RAT, for permission to send an initial Registration request on the associated RAT. The CoNAS entity may indicate to the DeNAS a time when it is acceptable to send the request and the CoNAS may indicate to other DeNAS entities (who may have RM state machines that are RM-REGISTERED) that they should not initiate new NAS activity on the associated RAT at the same time.

Note that when a DeNAS entity may receive a notification that a different DeNAS entity may be using the associated RAT at a particular time, the DeNAS may release the AN signaling connection, thus causing the DeNAS's CM state to transition to CM-IDLE.

When the DeNAS entity, who was RM-REGISTERED on the associated RAT, indicates that it is now RM-DEREGISTERED on the associated RAT, the CoNAS entity may transition to the FULL RM-DEREGISTERED state 1601. This transition shown in step 2 of FIG. 16.

When a DeNAS entity, that was not RM-REGISTERED on the associated RAT, indicates that it is now RM-REGISTERED on the associated RAT, the CoNAS entity may transition to the MULTIPLE RM-REGISTERED state 1603. This transition shown in step 3 of FIG. 16.

Note that when the CoNAS entity notifies a DeNAS entity that it can perform some operation (e.g. a periodic Registration Udpate), the CoNAS entity may also indicate to the DeNAS entity that the DeNAS entity is only permitted to perform the specific operation and not permitted to perform additional activity (e.g. establish PDU sessions and send UL data or receive downlink data). The CoNAS entity may indicate this to the DeNAS layer because a DeNAS entity is waiting to perform some higher priority activity. Thus, when the DeNAS performs a Periodic Registration Update, it may indicate to the network that it is performing a Periodic Registration Update but it cannot perform other operations (i.e. receive a DL data data) at this time. The UE may indicate this condition by providing a PSM Active Timer value of 0 during the periodic registration. Thus indicating that it is immediately entering CM-IDLE again.

MULTIPLE RM-REGISTERED 1603: In this state, at least two DeNAS entities are RM-REGISTERED on the associated RAT. In this state, the CoNAS entity needs to perform arbitration between the NAS functionalities of the DeNAS entities that have at least one state machine that is RM-REGISTERED on the associated RAT. The MULTIPLE RM-REGISTERED 1603 state may be further described as follows:

While in this state, the CoNAS entity may receive a request from a DeNAS entity, who has an RM state machine that is RM-REGISTERED on the associated RAT, for permission to send a NAS message request (e.g. mobility Registration Update, periodic Registration Update, Service Request, or UE Configuration Update). The CoNAS entity may indicate to the requesting DeNAS entity a time when it is acceptable to send the request on the associated RAT and it may indicate to the other DeNAS entities that it should not initiate any new NAS activity on the associated RAT at the same time.

Note that a request from the DeNAS entity, to the CoNAS entity, to send a periodic Registration Update may be based on the impending expiration of a periodic Registration Update timer.

Note that a request from the DeNAS entity, to the CoNAS entity, to send a mobility Registration Update may be based on a mobility event.

Alternatively, the DeNAS entity may provide the periodic Registration Update timer (or Non-3GPP Deregistration timer) to the CoNAS entity so that the CoNAS entity can detect when a periodic Registration update is required.

Alternatively, the DeNAS entity may provide the Registration Area to the CoNAS entity so that the CoNAS entity can detect when a mobility Registration update is required.

Note that when a DeNAS entity may receive a notification that a different DeNAS entity may be using the associated RAT at a particular time, the DeNAS may release the AN signaling connection, thus causing the DeNAS's CM state to transition to CM-IDLE.

While in this state, the CoNAS entity may receive requests from a DeNAS entity, whose RM state is RM-DEREGISTERED on the associated RAT, for permission to send a Registration request. The CoNAS entity may indicate to the DeNAS a time when it is acceptable to send the request on the associated RAT and the CoNAS may indicate to other DeNAS entities (who may have RM state machines that are RM-REGISTERED) that they should not initiate new NAS activity on the associated RAT at the same time.

Note that when a DeNAS entity may receive a notification that a different DeNAS entity may be using the associated RAT at a particular time, the DeNAS may release the AN signaling connection, thus causing the DeNAS's CM state to transition to CM-IDLE.

When a DeNAS entity, who has an RM state machine that is RM-REGISTERED on the associated RAT, indicates to the CoNAS entity that it is RM-DEREGISTERED on the associated RAT, the CoNAS entity may transition to the SINGLE RM-REGISTERED state 1602 if there is now only one DeNAS entity who has an RM state machine that is RM-REGISTERED on the associated RAT. This transition shown in step 4 of FIG. 16.

Note that when the CoNAS entity tells a DeNAS entity that it can perform some operation (e.g. a periodic Registration Update), the CoNAS entity may also indicate to the DeNAS entity that the DeNAS entity is only permitted to perform the specific operation and not permitted to perform additional activity (e.g. establish PDU sessions and send UL data or receive downlink data). The CoNAS entity may indicate this to the DeNAS layer because a DeNAS entity is waiting to perform some higher priority activity. Thus, when the DeNAS performs a Periodic Registration Update, it may indicate to the network that it is performing a Periodic Registration Update but it cannot perform other operations (i.e. receive a DL data data) at this time. The UE may indicate this condition by providing a PSM Active Timer value of 0 during the periodic registration. Thus indicating that it is immediately entering CM-IDLE again.

AS procedures to enable TDM sharing of an RX/TX chain are described herein in accordance with another embodiment. To maintain concurrent UL/DL communication with multiple PLMNs for Multi-SIM devices with a single RX and single TX chain or Dual RX and single TX chain, AS procedures are proposed herein to enable sharing of the RX/TX chain(s) in a TDM manner. Signaling at the AS layer internal to the UE and/or between the UE and network is used to coordinate the communication with the multiple PLMNs. For illustrative purposes, scenarios are considered herein wherein a UE is configured with two SIMs, SIM 1 and SIM 2, although the solutions described herein may be extended to configurations where more than 2 SIMs are configured.

Various classes of solutions can be envisioned, where the type of solution is dependent on the number of RX/TX chains, the length of the gap that is required in the UL/DL communication with a first PLMN to accommodate the UL/DL transmissions with a second PLMN, and/or the level of coordination between the network nodes of the PLMNs.

For scenarios where a short gap (e.g. 10-100 ms) or a micro-gap (e.g. <10 ms) in the UL/DL transmissions with a first PLMN is needed to accommodate the UL/DL transmissions with a second PLMN, a class of solutions that allows for dynamic sharing of an RX/TX chain may be used. Further optimization in these solutions can be gained when coordination between the network nodes of the multiple PLMNs is possible (e.g. intra-MNO or RAN sharing deployments).

For scenarios where a long gap (e.g. >100 ms) in the UL/DL transmissions with a first PLMN is needed to accommodate the UL/DL transmissions with a second PLMN, a class of solutions that allows for semi-static sharing of an RX/TX chain may be used. This class of solutions may also be applied for other scenarios, such as when the UL/DL transmissions with the second PLMN are delay tolerant or when coordination between the network nodes of the multiple PLMNs is not possible (e.g. inter-MNO deployments).

Figure 17:
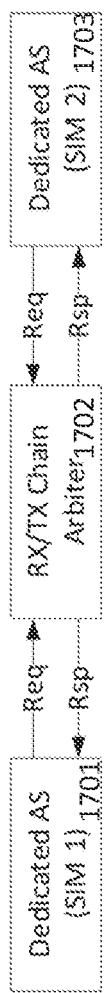
FIG. 17 shows a Dynamic Sharing of RX/TX Chains with RX/TX Chain Arbiter.

FIG. 17 shows a Dynamic Sharing of RX/TX Chains with RX/TX Chain Arbiter 1700. In one class of solutions, an RX/TX Chain Arbiter 1702 is used to enable TDM access to the shared RX/TX chain. Prior to an RXOP or TXOP, a request is made by the AS (e.g., dedicated AS 1701 or dedicated AS 1702) to the RX/TX Chain Arbiter 1702 to access the shared RX/TX chain. The RX/TX Chain Arbiter 1702 may provide a response to the AS to indicate whether or not access to the shared RX/TX chain was granted. Hereinafter, the term RX/TX chain arbiter and the term arbiter function may be used interchangeably. In one embodiment the arbiter function may be implemented by the RRC layer, the MAC layer, or the PHY layer. In another embodiment, the arbiter function may be implemented by the NAS layer Access to the RX/TX chain may be granted by the RX/TX Chain Arbiter 1702 on a first-come-first-serve basis. Alternatively, priority may be given based on USIM identity, the priority of the service for which access is being requested, the MAC procedure for which the access is being requested, etc.

The Request provided to the RX/TX Chain Arbiter 1702 by the AS may indicate when and for how long access to the RX/TX chain is desired; e.g. start time and duration, start time and end time, etc. The request may also include an indication of the priority of the access. The AS may determine when an RXOP occurs based on the configured CORE-SETs, search spaces, SPS configuration, DRX configuration, etc. The AS may determine when a TXOP occurs based on dynamic or configured grants, PUCCH occasions, RACH occasions, etc.

The Response provided by the RX/TX Chain Arbiter 1702 to the AS indicates whether or not access was granted; e.g. a Boolean flag where TRUE indicates access was granted and FALSE indicates access was not granted.

If access is granted to the shared RX/TX chain, the DL is monitored during the RXOP or the UL is transmitted during the TXOP. If access not granted to the shared RX/TX chain, the AS procedures may be adapted to take the missed RXOP/TXOP into account.

For scenarios where access to the RX/TX chain can be pre-determined based on traffic pattern and/or AS configuration, an explicit request/response may not be provided for each access attempt. Instead, the RX/TX Chain Arbiter may be provided with the relevant information and an indication of a missed RXOP/TXOP may be provided to effected dedicated AS when such an event occurs.

An indication of a missed RXOP/TXOP may also be provided to the network. The indication may be provided to the network during a TXOP that proceeds the occurrence of the missed RXOP/TXOP to enable the network to take proactive action to address the missed RXOP/TXOP. Alternatively, the UE may provide the indication during a subsequent TXOP to enable the network to take reactive action to the missed RXOP/TXOP. And in another alternative, to reduce signaling overhead associated with providing an explicit indication of a missed RXOP/TXOP, the UE may provide the network with a schedule for access to the RX/TX chain so the network can predict when a missed RXOP/TXOP may occur.

The RX/TX Chain Arbiter may support pre-emption. For example, for scenarios where access is priority-based, the RX/TX Chain Arbiter may allow a pending or ongoing access to be interrupted by a higher priority access. When such an interruption occurs, the RX/TX Chain Arbiter 1702 may provide an indication to the interrupted dedicated AS so that the interruption can be handled accordingly.

The interface between the AS and the RX/TX Chain Arbiter 1702 may be provided at one or more AS layers.

Figure 18:
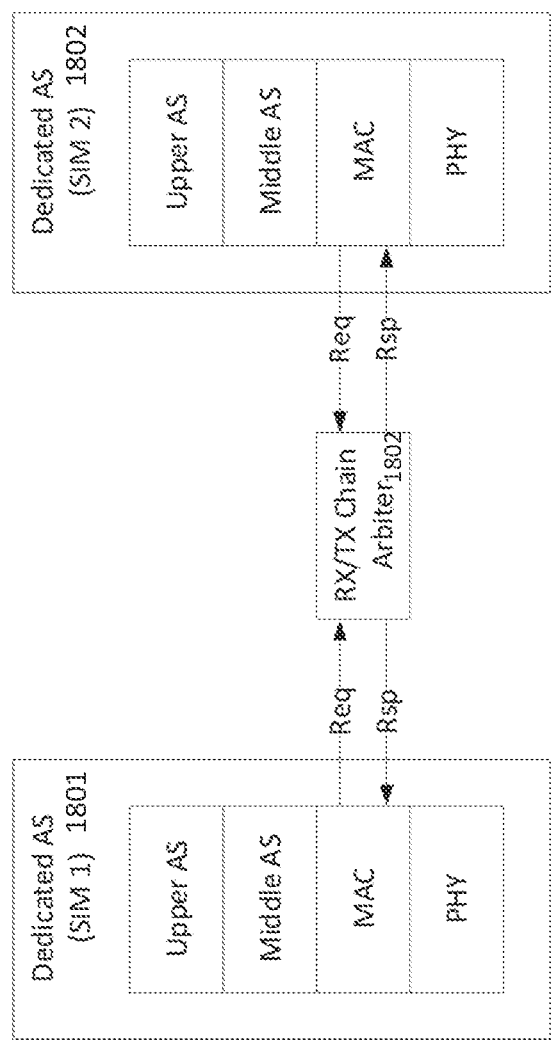
FIG. 18 shows an Interface between AS and RX/TX Chain Arbiter—option 1.

FIG. 18 shows an Interface between AS and RX/TX Chain Arbiter 1800. Each SIM is associated with a dedicated AS (e.g., dedicated AS 1801 and dedicated AS 1802) and the MAC layer of each dedicated AS; i.e. the DeMAC, interfaces with the RX/TX Chain Arbiter 1802, which may be realized in the CoMAC, to request access to the shared RX/TX chain(s). Signaling internal to the MAC may be used to adapt the behavior of the MAC procedures when an indication of a missed RXOP/TXOP is received from the RX/TX Chain Arbiter.

Figure 19:
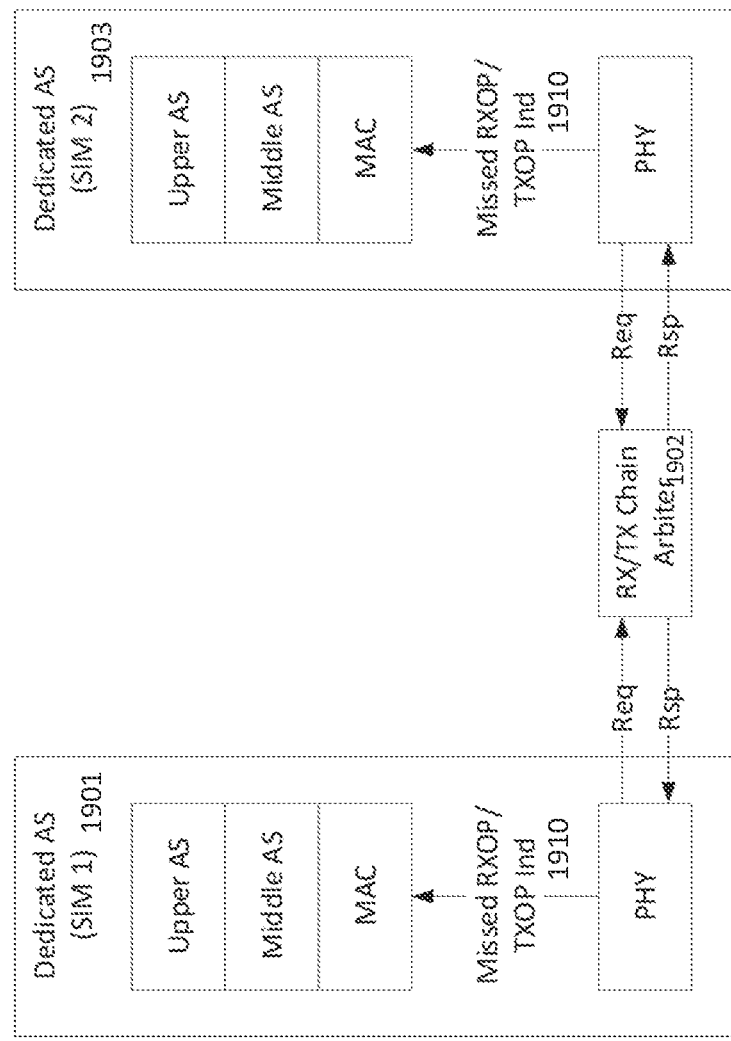
FIG. 19 shows an Interface between AS and RX/TX Chain Arbiter—option 2.

FIG. 19 shows an example interface between AS and RX/TX Chain Arbiter in accordance with another embodiment. In the example of FIG. 19, the PHY layer of each dedicated AS (e.g., dedicated AS 1901 and dedicated AS 1903) interfaces with the RX/TX Chain Arbiter 1902 to request access to the shared RX/TX chain(s). The PHY may provide a Missed RXOP/TXOP Indication 1910 to the MAC if access is not granted to shared RX/TX chain, and the MAC procedures are adapted to take the missed RXOP/TXOP into account. Alternatively, an indication that access to the RX/TX chain was granted may instead be provided. And in yet another alternative, both types of indications may be provided.

Figure 20:
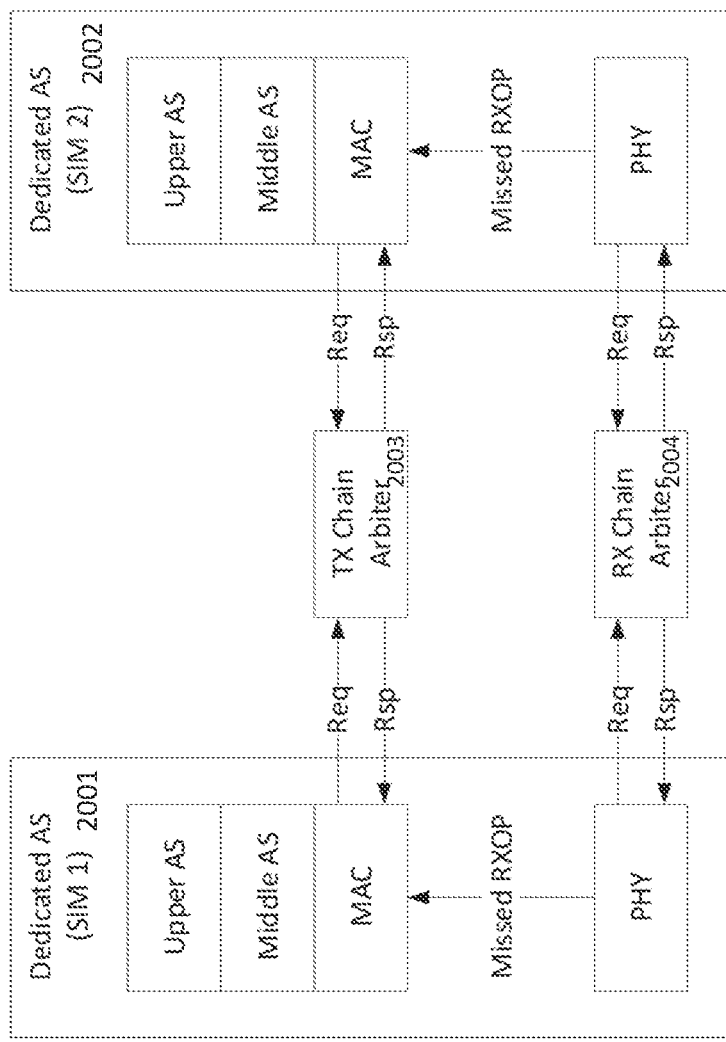
FIG. 20 shows an Interface between AS and RX/TX Chain Arbiter—option 3.

FIG. 20 shows another example interface between AS and RX/TX Chain Arbiter in accordance with another embodiment 2000. In the example of FIG. 20, the PHY layer or MAC layer of each dedicated AS (e.g., dedicated AS 2001 and dedicated AS 2002) interfaces with the RX/TX Chain Arbiter 2003, 2004 to request access to the shared RX/TX chain(s). In this example, the PHY layer of each dedicated AS interfaces with the RX/TX Chain Arbiter 2003, 2004 to request access to the shared RX chain and the MAC; e.g. the HARQ entity, interfaces with the RX/TX Chain Arbiter to request access to the TX chain.

Figure 21:
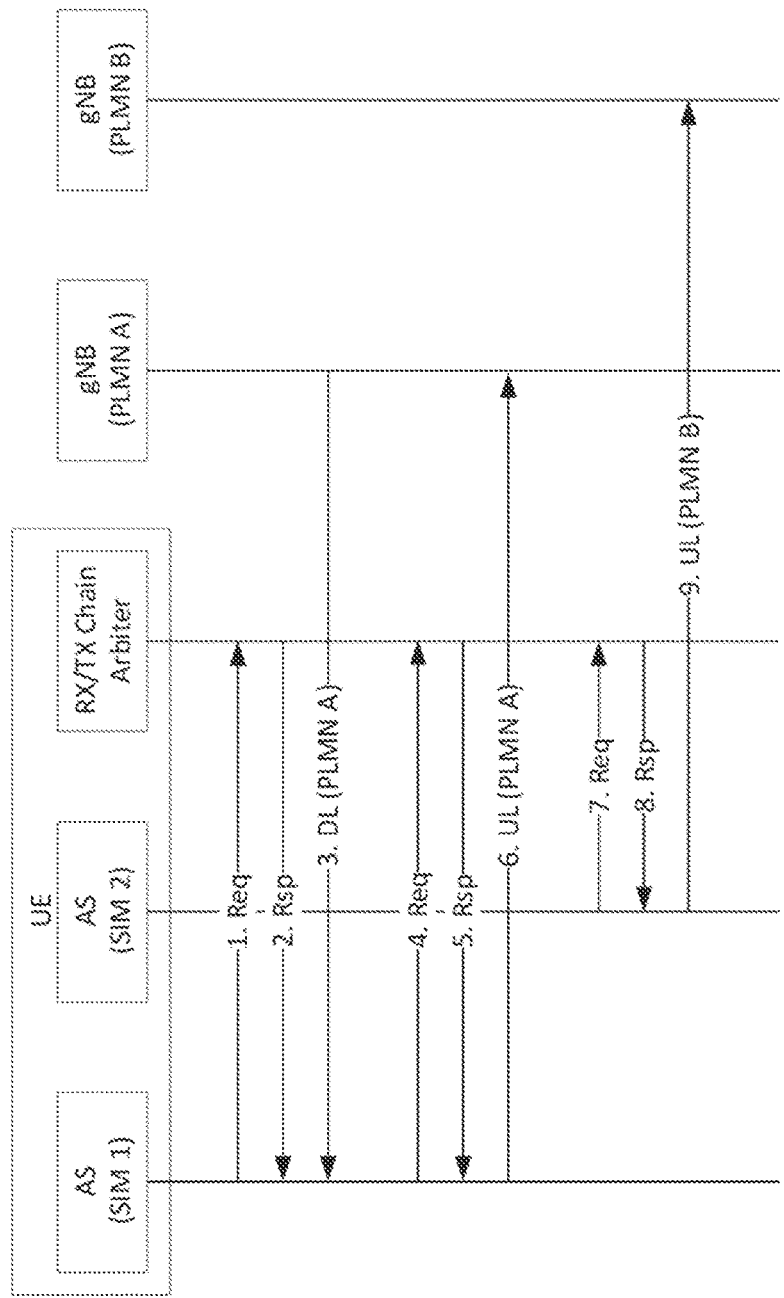
FIG. 21 shows an Signaling Diagram for Dynamic Sharing of RX/TX Chains—option 1.

FIG. 21 shows an example signaling diagram for dynamic sharing of RX/TX chains using an RX/TX Chain Arbiter 2100. In the text used to describe the steps of the signaling diagrams, the notation ASX is used to refer to the AS associated with SIM X and the term gNBY is used to refer to the gNB associated with PLMN Y.

Referring to FIG. 21, $AS_1$ may request access to the RX chain (step 1). The RX/TX Chain Arbiter may determine that the RX is available during the requested RXOPs and may provide a response indicating access was granted (Step 2). $AS_1$ may receive the DL transmission from $gNB_A$ during the requested RXOPs (step 3). $AS_1$ may request access to the TX chain (step 4). The RX/TX Chain Arbiter may determine that the TX is available during the requested TXOPs and may provide a response indicating access was granted (step 5). $AS_1$ may transmit the UL to $gNB_A$ during the requested TXOPs (step 6). $AS_2$ may request access to the TX chain (step 7). The RX/TX Chain Arbiter may determine the TX may be available during the requested TXOPs and may provide a response indicating access was granted (step 8). $AS_2$ may transmit the UL to $gNB_B$ during the requested TXOPs (step 9).

Figure 22:
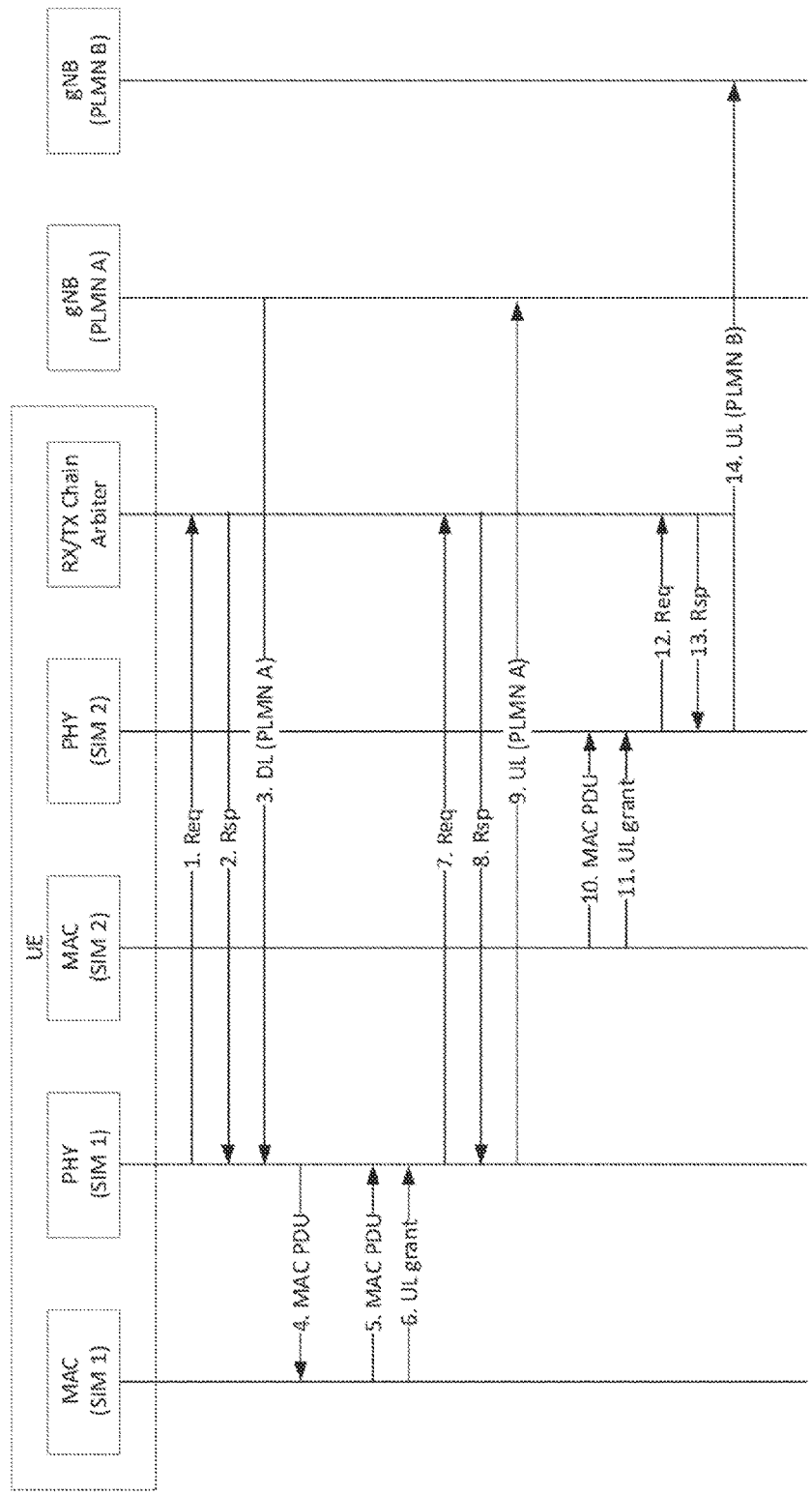
FIG. 22 shows an Signaling Diagram for Dynamic Sharing of RX/TX Chains—option 2.

FIG. 22 shows an example signaling diagram for dynamic sharing of RX/TX chains using an RX/TX Chain Arbiter where the PHY layer of each dedicated AS interfaces with the RX/TX Chain Arbiter 2200. Referring to FIG. 22, the PHY of $AS_1$ may request access to the RX chain (step 1). The RX/TX Chain Arbiter may determine the RX may be available during the requested RXOPs and may provide a response indicating access was granted (step 2). The PHY of $AS_1$ may receive the DL transmission from $gNB_A$ during the requested RXOPs (step 3). The PHY of $AS_1$ may send the received MAC PDU to the MAC of $AS_1$ (step 4). The MAC of $AS_1$ may send a MAC PDU to the PHY of $AS_1$ (step 5). The MAC of $AS_1$ may send an UL grant to the PHY of $AS_1$ (step 6). The PHY of $AS_1$ may request access to the TX chain (step 7). The RX/TX Chain Arbiter may determine the TX may be available during the requested TXOPs and may provide a response indicating access was granted (step 8). The PHY if $AS_1$ may transmit the UL to $gNB_A$ during the requested TXOPs (step 9). The MAC of $AS_2$ may send a MAC PDU to the PHY of $AS_2$ (step 10). The MAC of $AS_2$ may send an UL grant to the PHY of $AS_2$ (step 11). The PHY of $AS_2$ may request access to the TX chain (step 12). The RX/TX Chain Arbiter may determine the TX may be available during the requested TXOPs and may provide a response indicating access was granted (step 13). The PHY of $AS_2$ may transmit the UL to $gNB_B$ during the requested TXOPs (step 14).

Figure 23:
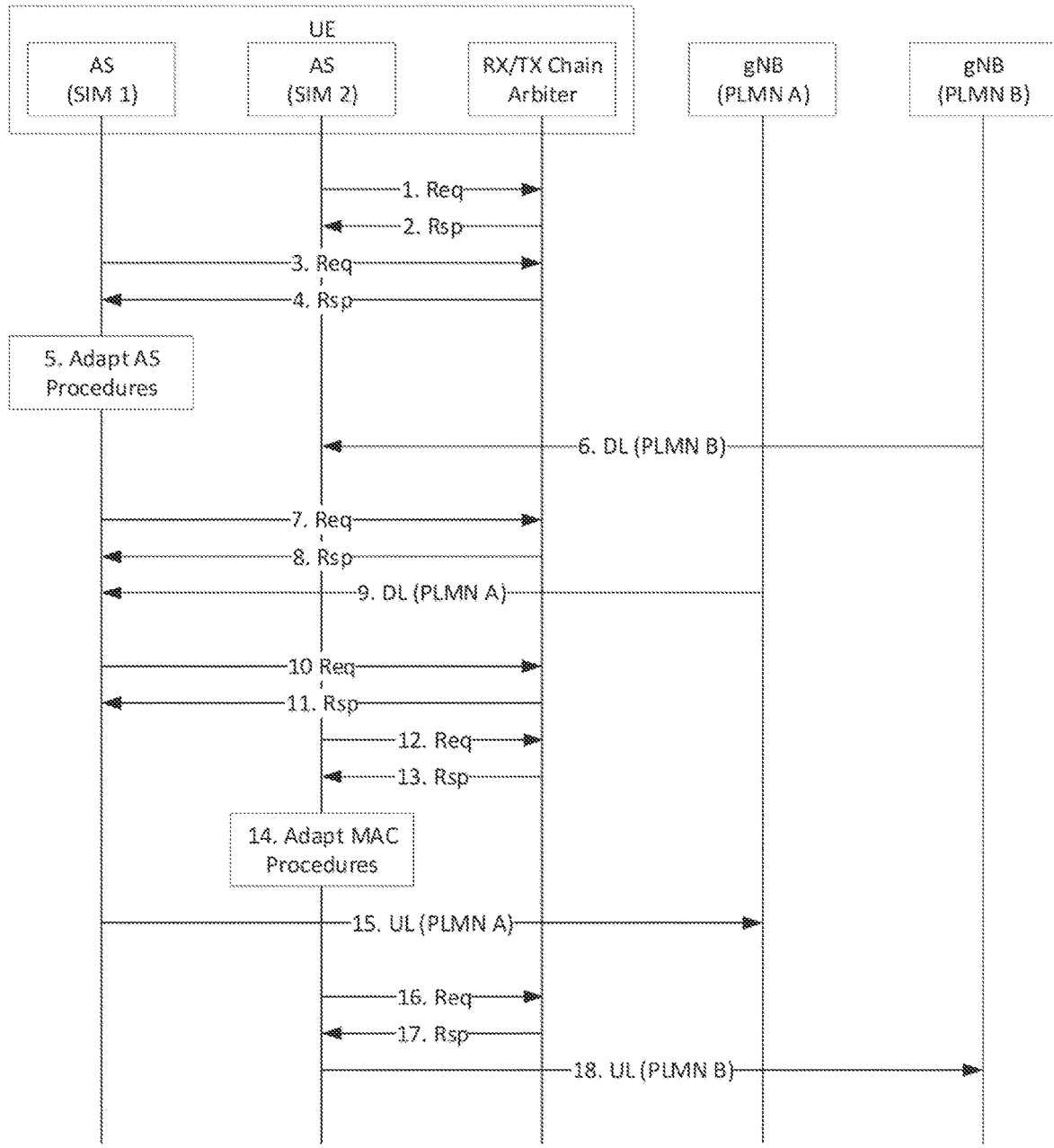
FIG. 23 shows an Signaling Diagram for Dynamic Sharing of RX/TX Chains with Missed RXOP/TXOP—option 1.

FIG. 23 shows a signaling diagram for dynamic sharing of RX/TX chains using an RX/TX Chain Arbiter for the case when missed RXOPs and TXOPs occur 2300. Referring to FIG. 23, $AS_2$ may request access to the RX chain (step 1). The RX/TX Chain Arbiter may determine the RX may be available during the requested RXOPs and may provide a response indicating access was granted (step 2). $AS_1$ may request access to the RX chain (step 3). The RX/TX Chain Arbiter may determine the RX may not be available during the requested RXOPs and may provide a response indicating access was not granted (Step 4). $AS_1$ adapts the AS procedures to account for the missed RXOPs (step 5). $AS_2$ may receive the DL transmission from $gNB_B$ during the requested RXOPs (step 6). $AS_1$ may request access to the RX chain (step 7). The RX/TX Chain Arbiter may determine the RX may be available during the requested RXOPs and may provide a response indicating access was granted (step 8). $AS_1$ may receive the DL transmission from $gNB_A$ during the requested RXOPs (step 9). $AS_1$ may request access to the TX chain (step 10). The RX/TX Chain Arbiter may determine the TX may be available during the requested TXOPs and may provide a response indicating access was granted (step 11). $AS_2$ may request access to the TX chain (step 12). The RX/TX Chain Arbiter may determine the TX may not be available during the requested TXOPs and may provide a response indicating access was not granted (step 13). $AS_2$ adapts the AS procedures to account for the missed TXOPs (step 14). $AS_1$ may transmit the UL to $gNB_A$ during the requested TXOPs (step 15). $AS_2$ may request access to the TX chain (step 16). The RX/TX Chain Arbiter may determine the TX may be available during the requested TXOPs and may provide a response indicating access was granted (step 17). $AS_2$ may transmit the UL to $gNB_B$ during the requested TXOPs (step 18).

Figure 24:
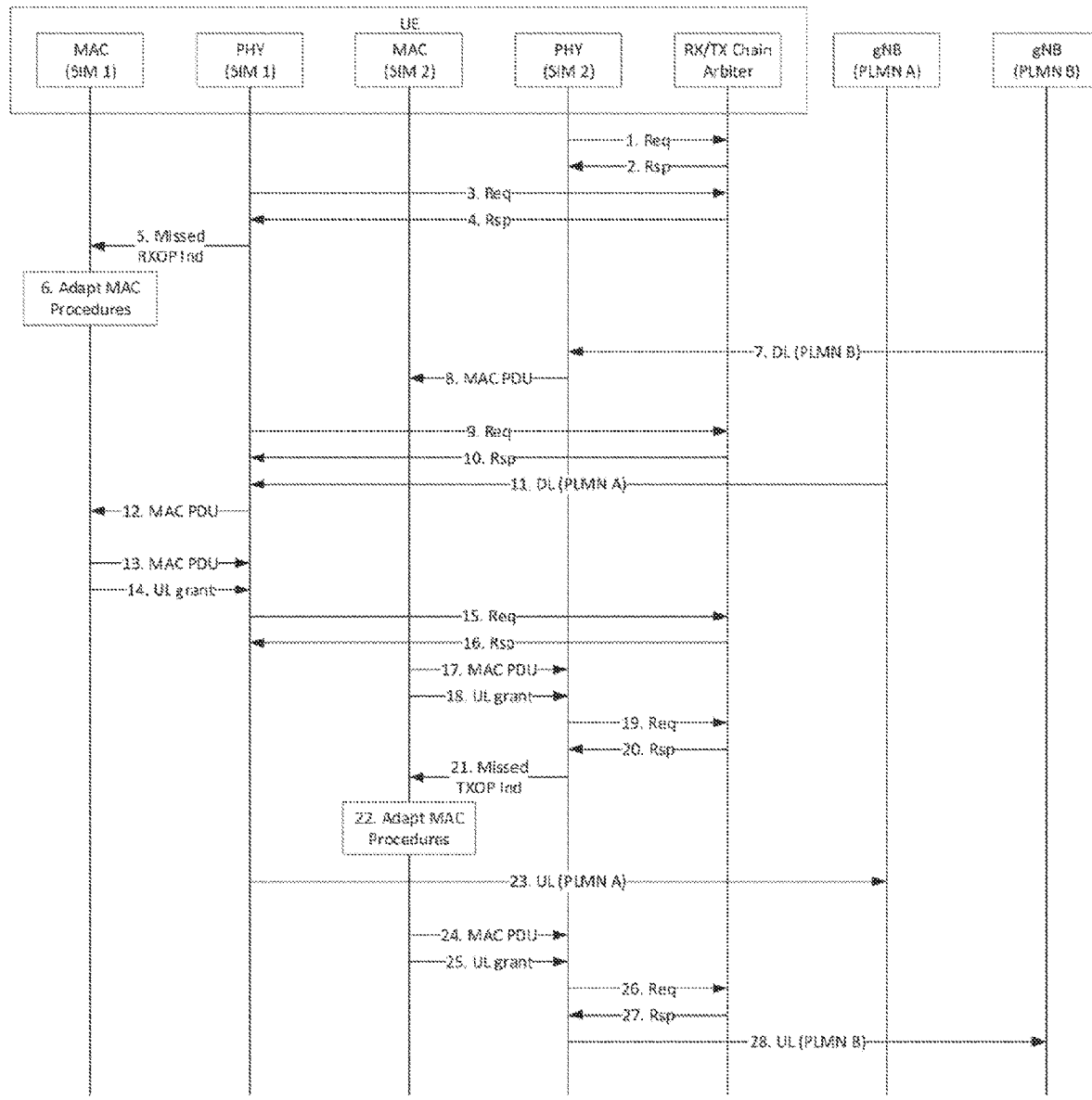
FIG. 24 shows a Signaling Diagram for Dynamic Sharing of RX/TX Chains with Missed RXOP/TXOP—option 2.

FIG. 24 shows signaling diagram for dynamic sharing of RX/TX chains using an RX/TX Chain Arbiter where the PHY layer of each dedicated AS interfaces with the RX/TX Chain Arbiter for the case when missed RXOPs and TXOPs occur 2400. Referring to FIG. 24, the PHY of $AS_2$ may request access to the RX chain (step 1). The RX/TX Chain Arbiter may determine the RX may be available during the requested RXOPs and may provide a response indicating access was granted (step 2). The PHY of $AS_1$ may request access to the RX chain (step 3). The RX/TX Chain Arbiter may determine the RX may not be available during the requested RXOPs and may provide a response indicating access was not granted (step 4). The PHY of $AS_1$ may provide a Missed RXOP Indication to the MAC of $AS_1$ (step 5). The MAC of $AS_1$ adapts the MAC procedures to account for the missed RXOP (step 6). The PHY of $AS_2$ may receive the DL transmission from $gNB_B$ during the requested RXOPs (step 7). The PHY of $AS_2$ may send the received MAC PDU to the MAC of $AS_2$ (step 8). The PHY of $AS_1$ may request access to the RX chain (step 9). The RX/TX Chain Arbiter may determine the RX may be available during the requested RXOPs and may provide a response indicating access was granted (step 10). The PHY of $AS_1$ may receive the DL transmission from $gNB_A$ during the requested RXOPs (step 11). The PHY of $AS_1$ may send the received MAC PDU to the MAC of $AS_1$ (step 12). The MAC of $AS_1$ may send a MAC PDU to the PHY of $AS_1$ (step 13). The MAC of $AS_1$ may send an UL grant to the PHY of $AS_1$ (step 14). The PHY of $AS_1$ may request access to the TX chain (step 15). The RX/TX Chain Arbiter may determine the TX may be available during the requested TXOPs and may provide a response indicating access was granted (step 16). The MAC of $AS_2$ may send a MAC PDU to the PHY of $AS_2$ (step 17). The MAC of $AS_2$ may send an UL grant to the PHY of $AS_2$ (step 18). The PHY of $AS_2$ may request access to the TX chain (step 19). The RX/TX Chain Arbiter may determine the TX may not be available during the requested TXOPs and may provide a response indicating access was not granted (step 20) The PHY of $AS_2$ may provide a Missed TXOP Indication to the MAC of $AS_2$ (step 21) The MAC of $AS_2$ adapts the MAC procedures to account for the missed TXOP (step 22) The PHY of $AS_1$ may transmit the UL to $gNB_A$ during the requested TXOPs (step 23) The MAC of $AS_2$ may send a MAC PDU to the PHY of $AS_2$ (step 24). The MAC of $AS_2$ may send an UL grant to the PHY of $AS_2$ (step 25). The PHY of $AS_2$ may request access to the TX chain (step 26). The RX/TX Chain Arbiter may determine the TX may be available during the requested TXOPs and may provide a response indicating access was granted (step 27). The PHY of $AS_2$ may transmit the UL to $gNB_B$ during the requested TXOPs (step 28).

The Semi-Static Sharing of RX/TX Chains is described herein in another class of solutions. Semi-static sharing of an RX/TX chain may be accomplished by suspending or releasing an RRC connection.

In one embodiment of the solution, each SIM is associated with a DeRRC and a CoRRC may determine which DeRRC should be active at a given time. The determination of which DeRRC should be active may be based on the establishment cause of an RRC setup request from higher upper layers, the QoS or priority of the logical channels or radios bearers configured for an AS connection, the procedures being currently performed by an AS connection; e.g. Random Access, Beam Failure Detection and Recovery.

Figure 25:
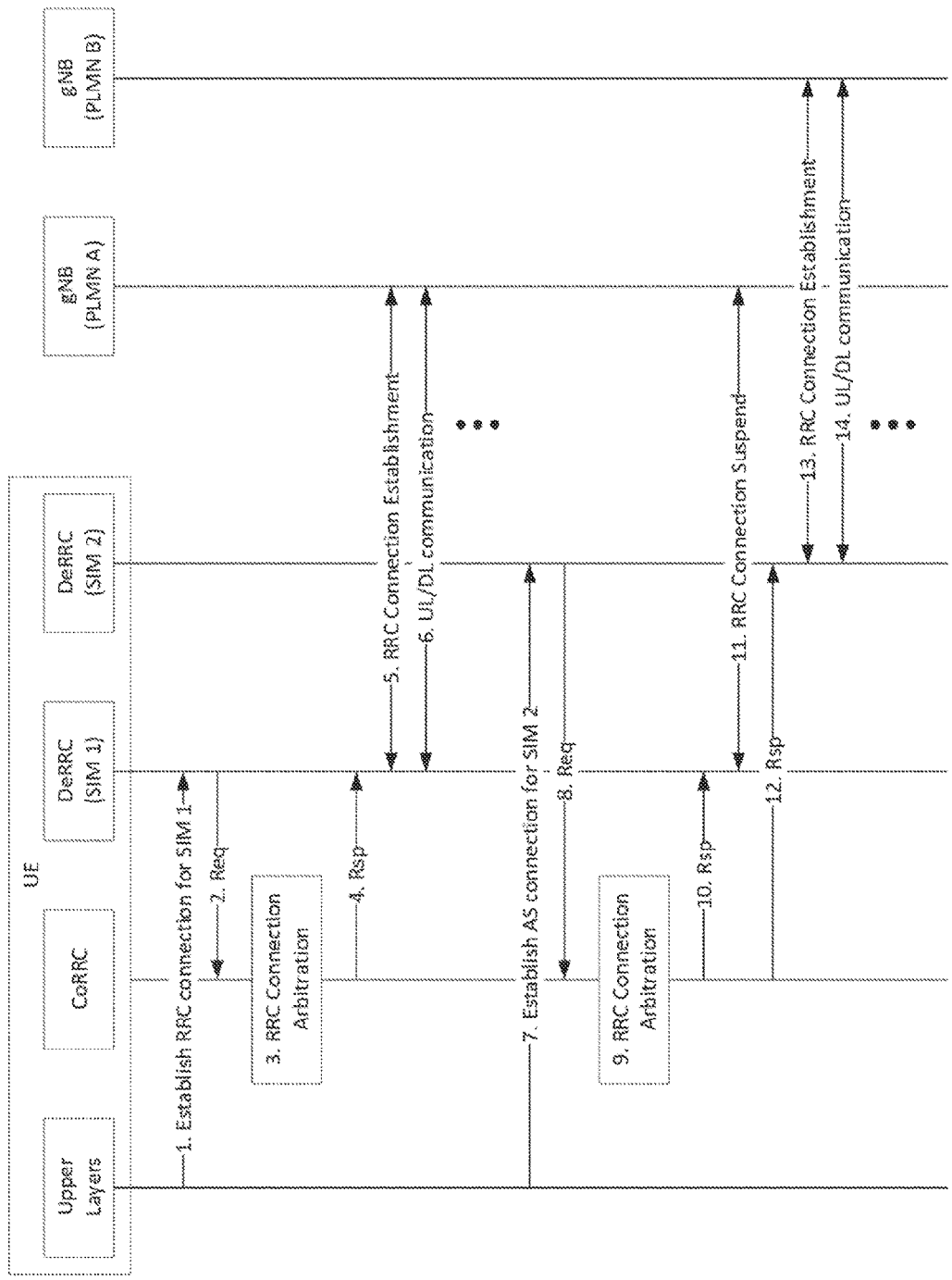
FIG. 25 shows a Signaling Diagram for Semi-Static Sharing with RRC Suspend.

FIG. 25 shows a procedure in which an RRC Suspend is used to enable semi-static sharing of an RX/TX chain 2500. Referring to FIG. 25, upper layers (e.g. NAS) may request that an RRC connection is established for SIM 1 (step 1). The DeRRC for SIM 1 may request to establish a new RRC connection (step 2). The CoRRC may determine that RRC connection can be established (step 3). The CoRRC may provide a response indicating the request was granted (step 4). The DeRRC for SIM 1 may establish an RRC connection with $gNB_A$ (step 5). The DeRRC may perform UL/DL communication with $gNB_A$ (step 6). Upper layers (e.g. NAS), may request that an RRC connection is established for SIM 2 (step 7). The DeRRC for SIM 2 may request to establish a new RRC connection (step 8). The CoRRC may determine that the RRC connection for SIM 1 must be suspended before the RRC connection for SIM 2 can be established (step 9). The CoRRC may provide a response to the DeRRC for SIM 1 indicating the RRC connection should be suspended (step 10). The dedicated sublayer for SIM 1 may suspend the RRC connection (step 11). The CoRRC may provide a response to the DeRRC for SIM 2 indicating the request to establish a new RRC connection was granted (step 12). The DeRRC for SIM 2 establishes an RRC connection with $gNB_B$ (step 13). The DeRRC may perform UL/DL communication with $gNB_B$ (step 14).

Figure 26:
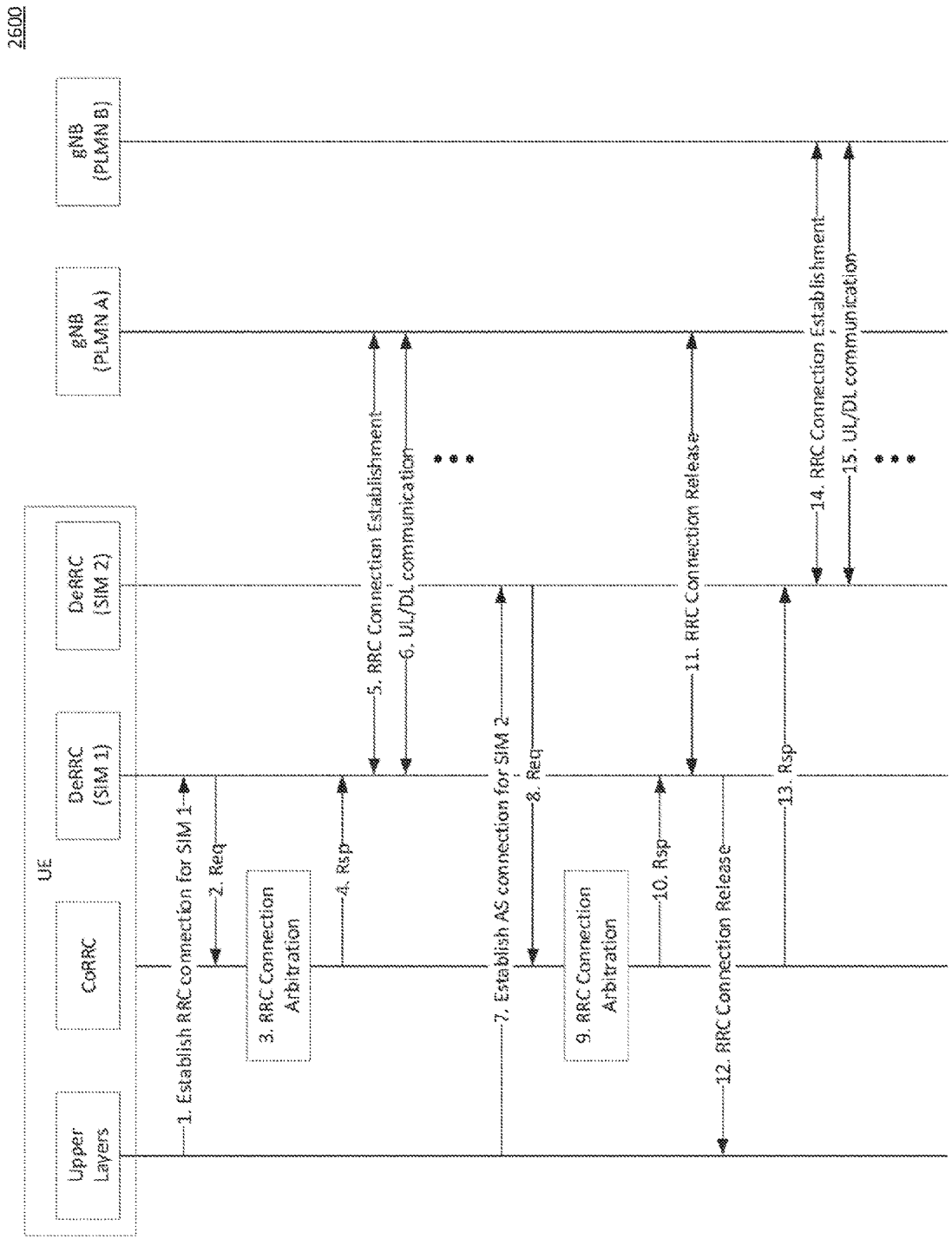
FIG. 26 shows a Signaling Diagram for Semi-Static Sharing with RRC Release.

FIG. 26 shows an example procedure in which another aspect of the solution RRC Release may be used to enable semi-static sharing of an RX/TX chain 2600. Referring to FIG. 26, upper layers (e.g. NAS) may request that an RRC connection is established for SIM 1 (step 1). The DeRRC for SIM 1 may request to establish a new RRC connection (step 2). The CoRRC may determine that RRC connection can be established (step 3). The CoRRC may provide a response indicating the request was granted (step 4). The DeRRC for SIM 1 establishes and RRC connection with $gNB_A$ (step 5) The DeRRC may perform UL/DL communication with $gNB_A$ (step 6). Upper layers (e.g. NAS) may request that an RRC connection is established for SIM 2 (step 7). The DeRRC for SIM 2 may request to establish a new RRC connection (step 8). The CoRRC may determine that RRC connection for SIM 1 must be released before the RRC connection for SIM 2 can be established (step 9). The CoRRC may provide a response to the DeRRC for SIM 1 indicating the RRC connection for SIM 1 should be released (step 10). The dedicated sublayer for SIM 1 may release the RRC connection (step 11). The dedicated sublayer for SIM 1 may inform upper layers that the RRC connection was released (step 12). The CoRRC may provide a response to the DeRRC for SIM 2 indicating the request to establish a new RRC connection was granted (step 13). The DeRRC for SIM 2 may establish an RRC connection with $gNB_B$ (step 14). The DeRRC may perform UL/DL communication with $gNB_B$ (step 15).

Effects of sharing RX/TX chains on the MAC is described herein. Solutions described herein apply to the overall MAC operation and specifically to MAC procedures that rely on timers and counters to control their behavior. Such MAC procedures include but are not limited to the following: Random Access, Maintenance of Uplink Time Alignment, UL/DL HARQ Operation, Scheduling Request, Buffer Status Reporting, Power Headroom Reporting, Discontinuous Reception, Activation/Deactivation of SCells, Bandwidth Part Operation and Beam Failure Detection and Recovery. Missed RXOPs/TXOPs can result in unnecessary and unintended effects on these MAC procedures. With knowledge of missed RXOPs/TXOPs, these MAC procedures may operate similarly to operation when sharing of the RX/TX chains is not required.

With respect to the effect on the MAC procedures, the impacts of sharing the RX/TX chains are considered for the UL and DL. Depending on the MAC procedure, both missed RXOPs and TXOPs may be considered; or only missed RXOPs or TXOPs may be considered. How access is requested to a shared RX chain and TX chain may be different.

The UE may perform sharing of a TX chain, according to which a transmission is not performed if access to the shared TX chain is not granted. When access to a shared TX chain is requested before a transmission, an indication as to whether or not the access was granted is provided to the MAC entity. The MAC entity considers that a transmission has been performed regardless of access request outcome, unless otherwise specified. For a transmission where no access request is performed, the access request is considered as granted.

Informing the NW of missed RXOP(s)/TXOP(s) is described herein. For scenarios where a priori determination of missed RXOP(s)/TXOP(s) is possible, the UE may transmit an indication to inform the network of the RXOP(s)/TXOP(s) that may be missed, thereby allowing adaption of the MAC behavior to be coordinated between the network and the UE. How the MAC behavior is adapted may be predetermined/preconfigured and the indication from the UE may be used to trigger when the adaption may occur. Alternatively, the indication may be comprised of information that informs the network of how the UE may adapt the MAC behavior. And in yet another alternative, how the MAC procedures are adapted may be negotiated between the network and the UE.

For scenarios where a priori determination of missed RXOP(s) is not possible, but the TX chain is available when the missed RXOP occurs, the indication of the missed RXOP may be transmitted using UL resources that are pre-configured (e.g. via a configured grant or PUCCH) if UL resources scheduled via a dynamic grant are not available.

Effects on MAC counters and timers are described herein. Sharing RX/TX chains may result in a loss of RXOPs and TXOPs, which results in a greater period of time to achieve a successful transmission. MAC procedures consider the number of opportunities and/or the period of time for the procedure to complete before declaring the procedure failed. To properly perform the procedures when an RX/TX chain is being shared, the missed RXOPs and TXOPs need to be considered.

For example, procedures such as Random Access, Scheduling Request and Beam Failure Detection and Recovery use counters to control how many unsuccessful attempts should occur before declaring the procedure failed. The incrementing of such counters should consider missed RXOPs and TXOPs to avoid declaring failure prematurely.

Existing MAC procedures assume when the PHY is instructed to perform an UL transmission for a MAC PDU or UCI (e.g. SR) the UL transmission occurs. To limit the frequency of transmission of MAC CEs and UCI with a particular MAC procedure, prohibit timers are set to prevent retransmission of the MAC CEs or UCI until prohibit timer expires. To properly control the frequency with which a MAC CE or UCI is transmitted and to ensure the transmission occurs when it is needed, the setting of these prohibit timers needs to consider missed TXOPs; e.g. the timers should not be set if transmission did not occur due to a missed TXOP.

Timers may be used to control when the UE monitors the DL for procedures such as Random Access and DRX. For scenarios where access to the RX Chain is not granted, monitoring of the DL may result in unnecessary power consumption and should not be performed. Therefore, missed RXOPs should be considered when determining if the DL should be monitored while such timers are running. Furthermore, extending the timer to account for the missed RXOPs may be appropriate in some scenarios. To ensure the timers maintained by the UE and gNB are synchronized, the UE may provide an indication to the gNB to indicate the timers are being extended. Alternatively, the UE may provide an indication to request that the timers are extended, and the network may then provide an indication in the DL to confirm if the request was granted.

Effects due to lost TXOPs are described herein. The MAC procedures should take into account when an UL transmission cannot be performed due to a missed TXOP. For example, a MAC PDU should not be generated if access to the shared TX chain is not granted for the time duration corresponding to the uplink grant indicated to the HARQ entity.

Effects on specific MAC procedures such as the Random Access Procedure and Random Access Resource Selection are described herein. The following procedure is proposed herein to take into account the effects of sharing an RX/TX chain:

After selecting a PRACH occasion, the MAC entity may request access to the TX chain for the time duration corresponding to the selected PRACH occasion. If access is not granted, the MAC entity may select the next available PRACH occasion and may request access to the TX chain for the time duration corresponding to the next available PRACH occasion. This process may be repeated until access is granted to the TX chain for the time duration corresponding to one of the selected PRACH occasions or access to the TX chain fails for all the PRACH occasions. If access to the TX chain fails for all the PRACH occasions, the Random Access Resource Selection procedure is repeated. The MAC entity may delay performing the Random Access Resource Selection procedure until after the backoff time, where the backoff time may be equal to or greater than the duration of time that the TX Chain is considered busy; i.e. the Random Access Resource Selection procedure isn't performed until the TX Chain is Idle. Alternatively, a fixed or randomly selected backoff time may be used. A procedure may be defined to count the number of failed RX chain access requests or the number of consecutive failed RX chain access requests. The count may be determined over a configured duration of time, where the duration of time may include infinity as a configuration option. If the count of (consecutive) failed RX chain access requests exceeds a configured threshold, the Random Access procedure is considered unsuccessfully completed and the MAC entity may indicate a Random Access problem to upper layers.

To implement this behavior, the procedure may be performed as follows:

1) if ra-AssociationPeriodIndex and si-RequestPeriod are configured:
2) determine the next available PRACH occasion from the PRACH occasions corresponding to the selected SSB in the association period given by ra-AssociationPeriodIndex in the si-RequestPeriod permitted by the restrictions given by the ra-ssb-OccasionMaskIndex if configured and for which access to the TX chain is granted (the MAC entity may select a PRACH occasion randomly with equal probability amongst the consecutive PRACH occasions corresponding to the selected SSB).

1) else if an SSB is selected above:
2) determine the next available PRACH occasion from the PRACH occasions corresponding to the selected SSB permitted by the restrictions given by the ra-ssb-OccasionMaskIndex if configured or indicated by PDCCH and for which access to the TX chain is granted (the MAC entity may select a PRACH occasion randomly with equal probability amongst the consecutive PRACH occasions, corresponding to the selected SSB; the MAC entity may take into account the possible occurrence of measurement gaps when determining the next available PRACH occasion corresponding to the selected SSB).
1) else if a CSI-RS is selected above:
2) if there is no contention-free Random Access Resource associated with the selected CSI-RS:
3) determine the next available PRACH occasion from the PRACH occasions, permitted by the restrictions given by the ra-ssb-OccasionMaskIndex if configured, corresponding to the SSB in candidateBeamRSList which is quasi-colocated with the selected CSI-RS and for which access to the TX chain is granted (the MAC entity may select a PRACH occasion randomly with equal probability amongst the consecutive PRACH occasions, corresponding to the SSB which is quasi-colocated with the selected CSI-RS; the MAC entity may take into account the possible occurrence of measurement gaps when determining the next available PRACH occasion corresponding to the SSB which is quasi-colocated with the selected CSI-RS).
2) else:
3) determine the next available PRACH occasion from the PRACH occasions in ra-OccasionList corresponding to the selected CSI-RS and for which access to the TX chain is granted (the MAC entity may select a PRACH occasion randomly with equal probability amongst the PRACH occasions occurring simultaneously but on different subcarriers, corresponding to the selected CSI-RS; the MAC entity may take into account the possible occurrence of measurement gaps when determining the next available PRACH occasion corresponding to the selected CSI-RS).
1) if a PRACH occasion is determined:
2) perform the Random Access Preamble transmission procedure.
1) else:
2) if NUM_FAILED_RX_CHAIN_ACCESS_REQUESTS>MAX_FAILED_TX_CHAIN_ACCESS_REQUESTS:
3) if the Random Access Resource selection is for the SpCell:
4) indicate a Random Access problem to upper layers;
4) if this Random Access procedure was triggered for SI request:
5) consider the Random Access procedure unsuccessfully completed.
3) else if the Random Access Preamble is transmitted on a SCell:
4) consider the Random Access procedure unsuccessfully completed.
2) if the Random Access procedure is not completed:
3) select a backoff time that is equal to or greater than the duration of time that access to the TX chain is not granted.
3) perform the Random Access Resource selection procedure after the backoff time.

To avoid repeated failures of the Random Access Resource Selection procedure due to a failure to access the TX chain for the selected PRACH occasion(s), the SSB or CSI-RS that was selected during a failed attempt of the Random Access Resource Selection procedure may be excluded as an option for selection on subsequent attempts of the procedure. Alternatively, a subsequent attempt of the Random Access Resource Selection procedure may be delayed until the TX chain is no longer in use by another DeRRC.

Random Access Preamble Transmission

The following procedure is proposed herein to take into account the effects of sharing an RX/TX chain:

Access to the TX chain can be requested during the Random Access Preamble Transmission procedure as an alternative to making the request during the Random Access Resource Selection procedure. If access is not granted, the MAC entity returns to the Random Access Resource Selection procedure and neither the PREAMBLE_POWER_RAMPING_COUNTER nor the PREAMBLE_TRANSMISSION_COUNTER are incremented.

The MAC entity may, for each Random Access Preamble:
1) if access to the TX chain for the time duration corresponding to the selected PRACH occasion is granted:
2) if PREAMBLE_TRANSMISSION_COUNTER is greater than one; and
2) if the notification of suspending power ramping counter has not been received from lower layers; and
2) if SSB or CSI-RS selected is not changed from the selection in the last Random Access Preamble transmission:
3) increment PREAMBLE_POWER_RAMPING_COUNTER by 1.
2) select the value of DELTA_PREAMBLE;
2) set PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP;
2) except for contention-free Random Access Preamble for beam failure recovery request, compute the RA-RNTI associated with the PRACH occasion in which the Random Access Preamble is transmitted;
2) instruct the physical layer to transmit the Random Access Preamble using the selected PRACH occasion, corresponding RA-RNTI (if available), PREAMBLE_INDEX and PREAMBLE_RECEIVED_TARGET_POWER.
1) else:
2) perform the Random Access Resource Selection procedure.

Random Access Response Reception

The following procedure is proposed herein to take into account the effects of sharing an RX/TX chain:

The starting of the RAR window is conditioned on obtaining access to the RX chain for the duration of the ra-ResponseWindow. If access is not granted, the Random Access Response reception is considered not successful and MAC entity performs the Random Access Resource Selection procedure. The MAC entity may delay performing the Random Access Resource Selection procedure until after the backoff time, where the backoff time may be equal to or greater than the duration of time that the RX Chain is considered busy; i.e. the Random Access Resource Selection procedure isn't performed until the RX Chain is Idle. Alternatively, a fixed or randomly selected backoff time may be used.

To implement this behavior, the procedure may be defined as follows:
1) if the contention-free Random Access Preamble for beam failure recovery request was transmitted by the MAC entity:

2) if access to the RX chain for the time duration corresponding to the ra-ResponseWindow configured in BeamFailureRecoveryConfig starting at the first PDCCH occasion from the end of the Random Access Preamble transmission is granted:
3) start the ra-ResponseWindow configured in BeamFailureRecoveryConfig at the first PDCCH occasion from the end of the Random Access Preamble transmission;
3) monitor for a PDCCH transmission on the search space indicated by recoverySearchSpaceId of the SpCell identified by the C-RNTI while ra-ResponseWindow is running.
1) else:
2) if access to the RX chain for the time duration corresponding to the ra-ResponseWindow configured in RACH-ConfigCommon starting at the first PDCCH occasion from the end of the Random Access Preamble transmission is granted:
3) start the ra-ResponseWindow configured in RACH-ConfigCommon at the first PDCCH occasion from the end of the Random Access Preamble transmission;
3) monitor the PDCCH of the SpCell for Random Access Response(s) identified by the RA-RNTI while the ra-ResponseWindow is running.
1) if ra-ResponseWindow configured in BeamFailureRecoveryConfig expires and if a PDCCH transmission on the search space indicated by recoverySearchSpaceId addressed to the C-RNTI has not been received on the Serving Cell where the preamble was transmitted; or
1) if ra-ResponseWindow configured in RACH-ConfigCommon expires, and if the Random Access Response containing Random Access Preamble identifiers that matches the transmitted PREAMBLE INDEX has not been received; or
1) if access to the RX chain was not granted:
2) consider the Random Access Response reception not successful;
2) increment PREAMBLE_TRANSMISSION_COUNTER by 1;
2) if PREAMBLE_TRANSMISSION_COUNTER= preambleTransMax+1:
3) if the Random Access Preamble is transmitted on the SpCell:
4) indicate a Random Access problem to upper layers;
4) if this Random Access procedure was triggered for SI request:
5) consider the Random Access procedure unsuccessfully completed.
3) else if the Random Access Preamble is transmitted on a SCell:
4) consider the Random Access procedure unsuccessfully completed.
2) if the Random Access procedure is not completed:
3) if access to the RX chain was granted:
4) select a random backoff time according to a uniform distribution between 0 and the PREAMBLE_BACKOFF;
3) else:
4) select a backoff time that corresponds to the duration of time that access to the RX chain is not granted.
3) if the criteria to select contention-free Random Access Resources is met during the backoff time; and
3) the RX chain is considered Idle:
4) perform the Random Access Resource selection procedure;
3) else:
4) perform the Random Access Resource selection procedure after the backoff time.

To facilitate using HARQ for Msg3 when sharing a TX chain, if the Random Access Response reception is considered successful and the RAR includes an UL grant, the MAC entity should obtain the MAC PDU to transmit from the multiplexing and assembly entity and store it in the Msg3 buffer whether or not access to the TX chain for the time duration corresponding to the RAR UL grant is granted.

Contention Resolution are described herein. The following procedure is proposed herein to take into account the effects of sharing an RX/TX chain:

The starting of the contention resolution window is conditioned on obtaining access to the RX chain for the duration of ra-ContentionResolutionTimer. If access is not granted, the Contention Resolution is considered not successful and the MAC entity performs the Random Access Resource Selection procedure. The MAC entity may delay performing the Random Access Resource Selection procedure until after the backoff time, where the backoff time may be equal to or greater than the duration of time that the RX Chain is considered busy; i.e. the Random Access Resource Selection procedure isn't performed until the RX Chain is Idle. Alternatively, a fixed or randomly selected backoff time may be used.

Note that HARQ is used for Msg3. Therefore, if Msg3 is not received by the gNB before ra-ContentionResolutionTimer expires, DCI may be used to schedule a retransmission. To facilitate using HARQ for Msg3 when sharing a TX chain, the starting of ra-ContentionResolutionTimer and monitoring of the PDCCH while ContentionResolutionTimer is running is not conditioned on obtaining access to the TX chain for the time duration corresponding to the RAR UL grant or a retransmission scheduled via DCI.

To implement this behavior, the procedure may be defined as follows:
1) if access to the RX chain for the time duration corresponding to the ra-ContentionResolutionTimer in the first symbol after the end of the Msg3 (re-)transmission is granted:
2) start the ra-ContentionResolutionTimer and restart the ra-ContentionResolutionTimer at each HARQ retransmission in the first symbol after the end of the Msg3 transmission;
2) monitor the PDCCH while the ra-ContentionResolutionTimer is running regardless of the possible occurrence of a measurement gap;
1) if ra-ContentionResolutionTimer expires; or
1) if access to the RX chain was not granted:
2) discard the TEMPORARY_C-RNTI;
2) consider the Contention Resolution not successful.
1) if the Contention Resolution is considered not successful:
2) flush the HARQ buffer used for transmission of the MAC PDU in the Msg3 buffer;
2) increment PREAMBLE_TRANSMISSION_COUNTER by 1;
2) if PREAMBLE_TRANSMISSION_COUNTER= preambleTransMax+1:
3) indicate a Random Access problem to upper layers.
3) if this Random Access procedure was triggered for SI request:
4) consider the Random Access procedure unsuccessfully completed.

2) if the Random Access procedure is not completed:
3) if access to the RX chain was granted:
4) select a random backoff time according to a uniform distribution between 0 and the PREAMBLE_BACK-OFF;
3) else:
4) select a backoff time that corresponds to the duration of time that access to the RX chain is not granted.
3) if the criteria to select contention-free Random Access Resources is met during the backoff time; and
3) the RX chain is considered Idle:
4) perform the Random Access Resource selection procedure;
3) else:
4) perform the Random Access Resource selection procedure after the backoff time.

Maintenance of Uplink Time Alignment is described herein. The following procedure is proposed herein to take into account the effects of sharing an RX/TX chain:

Missed RXOPs may result in missing a Timing Advance Command MAC CE, causing the MAC entity to perform the actions associated with expiration of a timeAlignmentTimer unnecessarily. For scenarios where the timeAlignmentTimer would expire during a missed RXOP, the timeAlignmentTimer may be extended by the duration of the missed RXOP, thereby providing the network with additional opportunities to transmit a Timing Advance Command MAC CE.

To implement this behavior, the procedure may be defined as follows:
1) when a timeAlignmentTimer expires:
2) if expiration occurs during a missed RXOP:
3) extend the timeAlignmentTimer by a duration corresponding to the missed RXOP.
2) else:
3) if the timeAlignmentTimer is associated with the PTAG:
4) flush all HARQ buffers for all Serving Cells;
4) notify RRC to release PUCCH for all Serving Cells, if configured;
4) notify RRC to release SRS for all Serving Cells, if configured;
4) clear any configured downlink assignments and configured uplink grants;
4) clear any PUSCH resource for semi-persistent CSI reporting;
4) consider all running timeAlignmentTimers as expired;
4) maintain NTA of all TAGs.
3) else if the timeAlignmentTimer is associated with a STAG, then for all Serving Cells belonging to this TAG:
4) flush all HARQ buffers;
4) notify RRC to release PUCCH, if configured;
4) notify RRC to release SRS, if configured;
4) clear any configured downlink assignments and configured uplink grants;
4) clear any PUSCH resource for semi-persistent CSI reporting;
4) maintain NTA of this TAG.

HARQ Operation and Logical Channel Prioritization is described herein. The following procedure is proposed herein to take into account the effects of sharing an RX/TX chain:

A MAC PDU may not be generated if access to the TX chain is not granted for the time duration corresponding to the uplink grant indicated to the HARQ entity.

To implement this behavior, the steps of HARQ Entity procedure may be made conditional on accessing the TX chain, and the procedure may be defined as follows:
For each uplink grant, the HARQ entity may:
1) if access to the TX chain for the time duration corresponding to this grant is granted:
2) <steps of HARQ Entity procedure>

Alternatively, the steps of the HARQ Entity procedure may remain unchanged, and the steps of the LCP procedure that correspond to when the MAC entity may not generate a MAC PDU for the HARQ entity may be defined as follows:

The MAC entity may not generate a MAC PDU for the HARQ entity if the following conditions are satisfied:
access to the TX chain is not granted for the time duration corresponding to the uplink grant indicated to the HARQ entity; or
the MAC entity is configured with skipUplinkTxDynamic with value true and the grant indicated to the HARQ entity was addressed to a C-RNTI, or the grant indicated to the HARQ entity is a configured uplink grant; and
there is no aperiodic CSI requested for this PUSCH transmission; and
the MAC PDU includes zero MAC SDUs; and
the MAC PDU includes only the periodic BSR and there is no data available for any LCG, or the MAC PDU includes only the padding BSR.

Scheduling Requests are described herein. The following procedure is proposed herein to take into account the effects of sharing an RX/TX chain:

A procedure may be defined to count the number of failed TX chain access requests or the number of consecutive failed TX chain access requests. The count may be determined over a configured duration of time, where the duration of time may include infinity as a configuration option. If the count of (consecutive) failed TX chain access requests exceeds a configured threshold, the Random Access procedure is initiated.

To implement this behavior, the procedure may be defined as follows:
1) if the MAC entity has no valid PUCCH resource configured for the pending SR; or
1) if NUM_FAILED_TX_CHAIN_ACCESS_REQUESTS>MAX_FAILED_TX_CHAIN_ACCESS_REQUESTS:
2) initiate a Random Access procedure on the SpCell and cancel the pending SR.

To avoid delaying subsequent SR transmissions unnecessarily and reaching sr-TransMax erroneously as a result of a failure to access the TX chain, the SR_COUNTER should only be incremented and the sr-ProhibitTimer should only be started if access to the TX chain is granted.

To implement this behavior, the procedure may be defined as follows:
2) if the PUCCH resource for the SR transmission occasion does not overlap with a UL-SCH resource:
3) if SR_COUNTER<sr-TransMax:
4) instruct the physical layer to signal the SR on one valid PUCCH resource for SR;
4) if access to the TX chain is granted:
5) increment SR_COUNTER by 1;
5) start the sr-ProhibitTimer.

Buffer Status Reporting is described herein. The following procedure is proposed herein to take into account the effects of sharing an RX/TX chain:

When checking if the UL resources can accommodate the BSR MAC CE, the MAC entity also checks if access to the TX chain is granted for the time duration that corresponds to the UL resources. If access is not granted, a BSR MAC CE is not generated; and the timers periodicBSR-Timer and retxBSR-Timer are not (re-)started. Furthermore, if access is not granted when a Regular BSR has been triggered and logicalChannelSR-DelayTimer is not running, a Scheduling Request is triggered.

To implement this behavior, the procedure may be defined as follows:
1) if the Buffer Status reporting procedure may determine that at least one BSR has been triggered and not cancelled:
2) if UL-SCH resources are available for a new transmission and the UL-SCH resources can accommodate the BSR MAC CE plus its subheader as a result of logical channel prioritization; and
2) if access to the TX chain is granted for the time duration that corresponds to the UL resources:
3) instruct the Multiplexing and Assembly procedure to generate the BSR MAC CE(s);
3) start or restart periodicBSR-Timer except when all the generated BSRs are long or short Truncated BSRs;
3) start or restart retxBSR-Timer.
2) if a Regular BSR has been triggered and logicalChannelSR-DelayTimer is not running:
3) if there is no UL-SCH resource available for a new transmission; or
3) if the MAC entity is configured with configured uplink grant(s) and the Regular BSR was triggered for a logical channel for which logicalChannelSR-Mask is set to false; or
3) if the UL-SCH resources available for a new transmission do not meet the LCP mapping restrictions configured for the logical channel that triggered the BSR; or
3) if access to the TX chain is not granted for the time duration that corresponds to the UL resources:
4) trigger a Scheduling Request.

Power Headroom Reporting is described herein. The following procedure is proposed herein to take into account the effects of sharing an RX/TX chain:

When checking if the UL resources can accommodate the MAC CE for PHR, the MAC entity also checks if access to the TX chain is granted for the time duration that corresponds to the UL resources. If access is not granted, a PHR MAC CE is not generated; the triggered PHR(s) are not canceled; and the timers phr-PeriodicTimer and phr-ProhibitTimer are not (re-)started.

To implement this behavior, the procedure may be defined as follows:
If the MAC entity has UL resources allocated for a new transmission the MAC entity may:
1) if it is the first UL resource allocated for a new transmission since the last MAC reset:
2) start phr-PeriodicTimer;
1) if the Power Headroom reporting procedure may determine that at least one PHR has been triggered and not cancelled; and
1) if the allocated UL resources can accommodate the MAC CE for PHR which the MAC entity is configured to transmit, plus its subheader, as a result of LCP; and
1) if access to the TX chain is granted for the time duration that corresponds to the UL resources:
2) if multiplePHR with value true is configured:
3) for each activated Serving Cell with configured uplink associated with any MAC entity:
4) obtain the value of the Type 1 or Type 3 power headroom for the corresponding uplink carrier;
4) if this MAC entity has UL resources allocated for transmission on this Serving Cell; or
4) if the other MAC entity, if configured, has UL resources allocated for transmission on this Serving Cell and phr-ModeOtherCG is set to real by upper layers:
5) obtain the value for the corresponding PCMAX,f,c field from the physical layer.
3) if phr-Type2OtherCell with value true is configured:
4) if the other MAC entity is E-UTRA MAC entity:
5) obtain the value of the Type 2 power headroom for the SpCell of the other MAC entity (i.e. E-UTRA MAC entity);
5) if phr-ModeOtherCG is set to real by upper layers:
6) obtain the value for the corresponding PCMAX,f,c field for the SpCell of the other MAC entity (i.e. E-UTRA MAC entity) from the physical layer.
3) instruct the Multiplexing and Assembly procedure to generate and transmit the Multiple Entry PHR MAC CE based on the values reported by the physical layer.
2) else (i.e. Single Entry PHR format is used):
3) obtain the value of the Type 1 power headroom from the physical layer for the corresponding uplink carrier of the PCell;
3) obtain the value for the corresponding PCMAX,f,c field from the physical layer;
3) instruct the Multiplexing and Assembly procedure to generate and transmit the Single Entry PHR MAC CE based on the values reported by the physical layer.
2) start or restart phr-PeriodicTimer;
2) start or restart phr-ProhibitTimer;
2) cancel all triggered PHR(s).

Discontinuous Reception (DRX) is described herein. The following procedure is proposed herein to take into account the effects of sharing an RX/TX chain:

The MAC entity may request access to the RX chain at the start of the DRX cycle for the duration of drx-onDurationTimer. If access is granted, normal DRX operation is followed; e.g. start drx-onDurationTimer, monitor PDCCH, etc. If access not granted, drx-onDurationTimer is not started and the MAC entity enters DRX. Alternatively, the MAC entity may extend drx-onDurationTimer by a duration corresponding to the missed RXOP.

The drx-InactivityTimer is the duration that the MAC entity waits to successfully decode a PDCCH, from the last successful decoding of a PDCCH. If a PDCCH is not successfully decoded before drx-InactivityTimer expires, the MAC entity enters DRX. The MAC entity starts or restarts drx-InactivityTimer following the successful decoding of a PDCCH. When drx-InactivityTimer is (re-)started, the MAC entity may request access to the RX chain for the duration of drx-InactivityTimer. If access is granted, normal DRX operation is followed. If access is not granted, drx-InactivityTimer is stopped and the MAC entity enters DRX. Alternatively, the MAC entity may extend or pause drx-InactivityTimer by a duration corresponding to the missed RXOP.

The drx-HARQ-RTT-TimerDL is started if the PDCCH indicates a DL transmission or a MAC PDU is received in a configured downlink assignment. When this timer is started, the MAC entity may request access to the RX chain for the duration of drx-HARQ-RTT-TimerDL. Whether or not access is granted, upon expiration of drx-HARQ-RTT-TimerDL, if the data of the corresponding HARQ process was not successfully decoded drx-RetransmissionTimerDL is started. When this timer is started, the MAC entity may request access to the RX chain for the duration of drx-RetransmissionTimerDL. If access is granted, normal DRX operation is followed. If access is not granted, drx-RetransmissionTimerDL is stopped and the MAC entity enters DRX. Alternatively, the MAC entity may extend or pause drx-RetransmissionTimerDL by a duration corresponding to the missed RXOP.

To facilitate using HARQ when sharing a TX chain, for scenarios where a MAC PDU is not transmitted in a configured/dynamic uplink grant because of a missed TXOP, the drx-HARQ-RTT-TimerUL for the corresponding HARQ process is still started. And upon expiration of drx-HARQ-RTT-TimerUL, drx-RetransmissionTimerUL is started.

When the DRX timers are paused/extended due to a missed RXOP, if the TX chain is available, an indication may be transmitted to the gNB to inform it of the action.

Activation/Deactivation of SCells is described herein. The following procedure is proposed herein to take into account the effects of sharing an RX/TX chain:

If running, the sCellDeactivationTimer for a given SCell may be paused during a missed RXOP for the Serving Cell scheduling the SCell.

If a MAC PDU is not transmitted in a configured/dynamic uplink grant because of a missed TXOP, the sCellDeactivationTimer associated with the SCell should be restarted.

Bandwidth Part Operation is described herein. The following procedure is proposed herein to take into account the effects of sharing an RX/TX chain:

Missed RXOPs may result in missed DL assignments and UL grants, causing the bwp-InactivityTimer to not get reset, which can lead to an erroneous BWP switch. For scenarios where bwp-InactivityTimer would expire during a missed RXOP, the bwp-InactivityTimer may be extended by the duration of the missed RXOP, thereby providing the network with additional opportunities trigger a restart of bwp-InactivityTimer.

To implement this behavior, the procedure may be defined as follows:
2) if the bwp-InactivityTimer associated with the active DL BWP expires:
3) if expiration occurs during a missed RXOP:
4) extend the bwp-InactivityTimer by a duration corresponding to the missed RXOP.
3) else:
4) if the defaultDownlinkBWP-Id is configured:
5) perform BWP switching to a BWP indicated by the defaultDownlinkBWP-Id.
4) else:
5) perform BWP switching to the initialDownlinkBWP.

Beam Failure Detection and Recovery is described herein. The following procedure is proposed herein to take into account the effects of sharing an RX/TX chain:

If running, the beamFailureDetectionTimer may be extended or paused by a duration corresponding to the missed RXOP.

To implement this behavior, the procedure may be defined to include the following:
1) if an indication of a missed RXOP has been received and the beamFailureDetectionTimer is running:
2) extend the beamFailureDetectionTimer by the duration of the missed RXOP.

If it can be assumed that that lower layers may not generate a beam failure instance indication during a missed RXOP, then no further modification to the procedure may be required. However, if this cannot be assumed, then the procedure may be further modified such that beam failure instance indications received from lower layers during a missed RXOP are ignored.

To implement this behavior, the procedure may be modified as follows:
1) if beam failure instance indication has been received from lower layers during an RXOP that is not considered to have been missed:
2) start or restart the beamFailureDetectionTimer;
2) increment BFI_COUNTER by 1;
2) if BFI_COUNTER>=beamFailureInstanceMaxCount:
3) initiate a Random Access procedure on the SpCell.

In either of the schemes for TX or RX capability sharing described herein, the TX capability of the UE may include one or more of the number of transmitters, the transmit power budget, the UpLink (UL) Multiple Input Multiple Output (MIMO) capability, the UL Carrier Aggregation (CA) capability, the UL BandWitdh Part (BWP) operation capability. Similarly, the RX capability of the UE may include one or more of the number of receivers, the DownLink (DL) MIMO capability, the DL CA capability, the DL BandWitdh Part (BWP) operation capability. The UE may signal to one or more of the plurality of networks, one or more of these capabilities. Additionally, the UE may signal to one or more of the plurality of networks a change in these capabilities. For example, a UE with a two receiver performing a dual connectivity reception from the network may indicate to the network that its reception capability is limited to one receiver if one of the receivers of the UE is re-assigned for a reception from another network.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that may be multiplexed together in the same spectrum to address a broad set of 3GPP NR use cases with diverging requirements. The ultra-mobile broadband is expected to include cmWave and mmWave spectrum that may provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility.

The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications, which may include any of Vehicle-to-Vehicle Communication (V2V), Vehicle-to-Infrastructure Communication (V2I), Vehicle-to-Network Communication (V2N), Vehicle-to-Pedestrian Communication (V2P), and vehicle communications with other entities. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multi-person video calls, autonomous driving, augmented reality, tactile internet, and virtual reality to name a few. All of these use cases and others are contemplated herein.

Figure 27A:
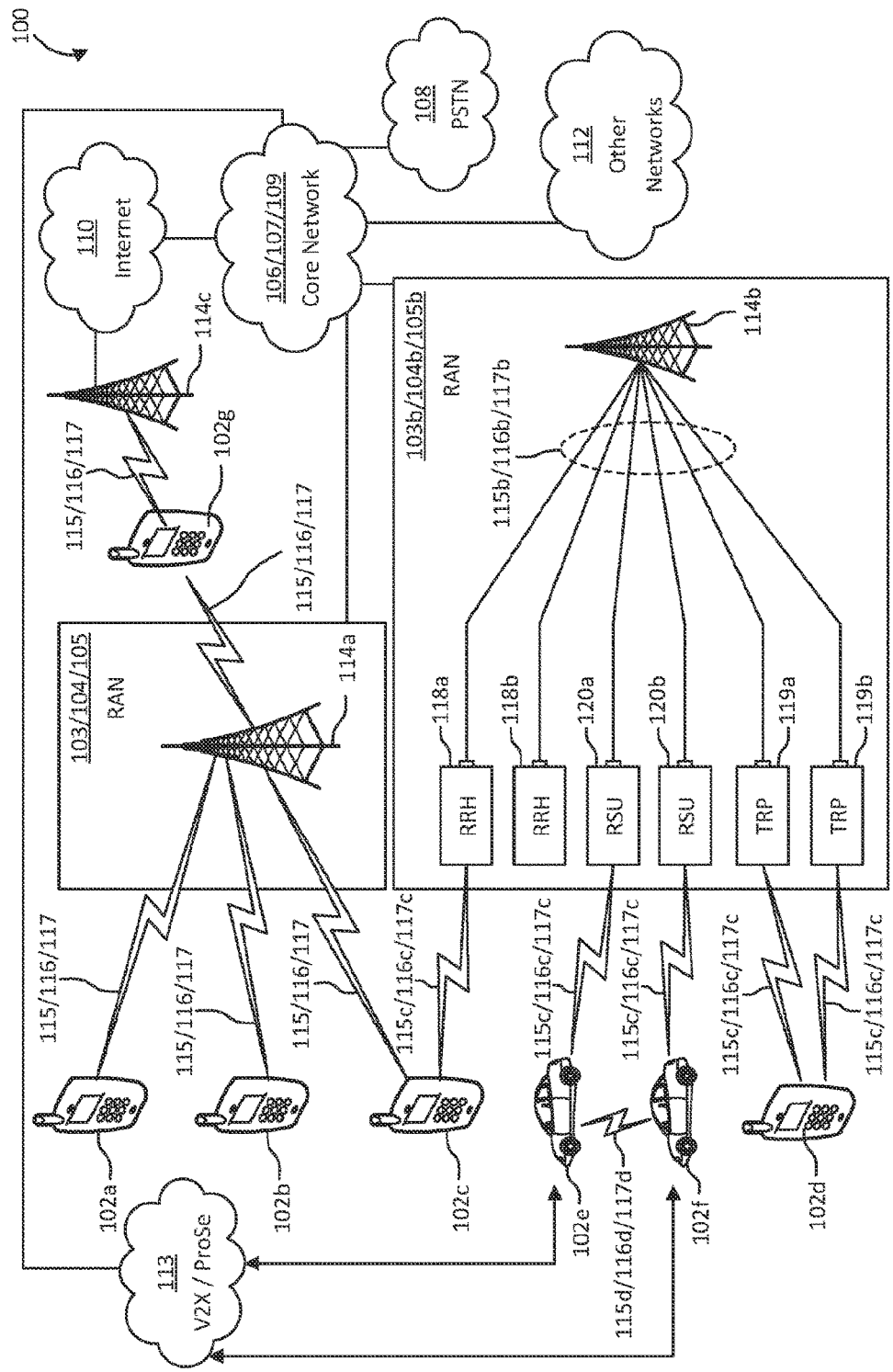
FIG. 27A illustrates one embodiment of an example communications system in which the methods and apparatuses described and claimed herein may be embodied.

FIG. 27A illustrates one embodiment of an example communications system 100 in which the methods and apparatuses described and claimed herein may be embodied. As shown, the example communications system 100 may include wireless transmit/receive units (WTRUs) 102a, 102b, 102c, 102d, 102e, 102f, and/or 102g (which generally or collectively may be referred to as WTRU 102), a radio access network (RAN) 103/104/105/103b/104b/105b, a core network 106/107/109, a public switched telephone network (PSTN) 108, the Internet 110, other networks 112, and V2X server (or ProSe function and server) 113, though it will be appreciated that the disclosed embodiments contemplate any number of WTRUs, base stations, networks, and/or network elements. Each of the WTRUs 102a, 102b, 102c, 102d, 102e, 102f, 102g may be any type of apparatus or device configured to operate and/or communicate in a wireless environment. Although each WTRU 102a, 102b, 102c, 102d, 102e, 102f, 102g is depicted in FIGS. 27A-27E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (Remote Radio Heads) 118a, 118b, TRPs (Transmission and Reception Points) 119a, 119b, and/or RSUs (Roadside Units) 120a and 120b to facilitate access to one or more communication networks, such as the core network 106/107/109, the Internet 110, the other networks 112, and/or V2X server (or ProSe function and server) 113. RRHs 118a, 118b may be any type of device configured to wirelessly interface with at least one of the WTRU 102c, to facilitate access to one or more communication networks, such as the core network 106/107/109, the Internet 110, and/or the other networks 112. TRPs 119a, 119b may be any type of device configured to wirelessly interface with at least one of the WTRU 102d, to facilitate access to one or more communication networks, such as the core network 106/107/109, the Internet 110, and/or the other networks 112. RSUs 120a and 120b may be any type of device configured to wirelessly interface with at least one of the WTRU 102e or 102f, to facilitate access to one or more communication networks, such as the core network 106/107/109, the Internet 110, the other networks 112, and/or V2X server (or ProSe function and server) 113. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b, TRPs 119a, 119b, and/or RSUs 120a and 120b, over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b, TRPs 119a, 119b and/or RSUs 120a, 120b, may communicate with one or more of the WTRUs 102c, 102d, 102e, 102f over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

The WTRUs 102a, 102b, 102c, 102d, 102e, 102f, and/or 102g may communicate with one another over an air interface 115d/116d/117d (not shown in the figures), which may be any suitable wireless communication link (e.g., radio frequency (RF), microwave, infrared (IR), ultraviolet (UV), visible light, cmWave, mmWave, etc.). The air interface 115*d*/116*d*/117*d* may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 103/104/105 and the WTRUs 102*a*, 102*b*, 102*c*, or RRHs 118*a*, 118*b*, TRPs 119*a*, 119*b* and RSUs 120*a*, 120*b*, in the RAN 103*b*/104*b*/105*b* and the WTRUs 102*c*, 102*d*, 102*e*, 102*f*, may implement a radio technology such as Universal Mobile Telecommunications System (UMTS) Terrestrial Radio Access (UTRA), which may establish the air interface 115/116/117 or 115*c*/116*c*/117*c* respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c*, or RRHs 118*a*, 118*b*, TRPs 119*a*, 119*b*, and/or RSUs 120*a*, 120*b*, in the RAN 103*b*/104*b*/105*b* and the WTRUs 102*c*, 102*d*, may implement a radio technology such as Evolved UMTS Terrestrial Radio Access (E-UTRA), which may establish the air interface 115/116/117 or 115*c*/116*c*/117*c* respectively using Long Term Evolution (LTE) and/or LTE-Advanced (LTE-A). In the future, the air interface 115/116/117 may implement 3GPP NR technology. The LTE and LTE-A technology includes LTE D2D and V2X technologies and interface (such as Sidelink communications and etc). The 3GPP NR technology includes NR V2X technologies and interface (such as Sidelink communications and etc).

In an embodiment, the base station 114*a* in the RAN 103/104/105 and the WTRUs 102*a*, 102*b*, 102*c*, or RRHs 118*a*, 118*b*, TRPs 119*a*, 119*b* and/or RSUs 120*a*, 120*b*, in the RAN 103*b*/104*b*/105*b* and the WTRUs 102*c*, 102*d*, 102*e*, 102*f* may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*c* in FIG. 27A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114*c* and the WTRUs 102*e*, may implement a radio technology such as IEEE 802.11 to establish a wireless local area network (WLAN). In an embodiment, the base station 114*c* and the WTRUs 102*d*, may implement a radio technology such as IEEE 802.15 to establish a wireless personal area network (WPAN). In yet another embodiment, the base station 114*c* and the WTRUs 102*e*, may utilize a cellular-based RAT (e.g., WCDMA, CDMA2000, GSM, LTE, LTE-A, etc.) to establish a picocell or femtocell. As shown in FIG. 27A, the base station 114*b* may have a direct connection to the Internet 110. Thus, the base station 114*c* may not be required to access the Internet 110 via the core network 106/107/109.

The RAN 103/104/105 and/or RAN 103*b*/104*b*/105*b* may be in communication with the core network 106/107/109, which may be any type of network configured to provide voice, data, applications, and/or voice over internet protocol (VoIP) services to one or more of the WTRUs 102*a*, 102*b*, 102*c*, 102*d*. For example, the core network 106/107/109 may provide call control, billing services, mobile location-based services, pre-paid calling, Internet connectivity, video distribution, etc., and/or perform high-level security functions, such as user authentication.

Although not shown in FIG. 27A, it will be appreciated that the RAN 103/104/105 and/or RAN 103*b*/104*b*/105*b* and/or the core network 106/107/109 may be in direct or indirect communication with other RANs that employ the same RAT as the RAN 103/104/105 and/or RAN 103*b*/104*b*/105*b* or a different RAT. For example, in addition to being connected to the RAN 103/104/105 and/or RAN 103*b*/104*b*/105*b*, which may be utilizing an E-UTRA radio technology, the core network 106/107/109 may also be in communication with another RAN (not shown) employing a GSM radio technology.

The core network 106/107/109 may also serve as a gateway for the WTRUs 102*a*, 102*b*, 102*c*, 102*d*, 102*e* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103*b*/104*b*/105*b* or a different RAT.

Some or all of the WTRUs 102*a*, 102*b*, 102*c*, 102*d* in the communications system 100 may include multi-mode capabilities, e.g., the WTRUs 102*a*, 102*b*, 102*c*, 102*d*, and 102*e* may include multiple transceivers for communicating with different wireless networks over different wireless links. For example, the WTRU 102*e* shown in FIG. 27A may be configured to communicate with the base station 114*a*, which may employ a cellular-based radio technology, and with the base station 114*c*, which may employ an IEEE 802 radio technology.

Figure 27B:
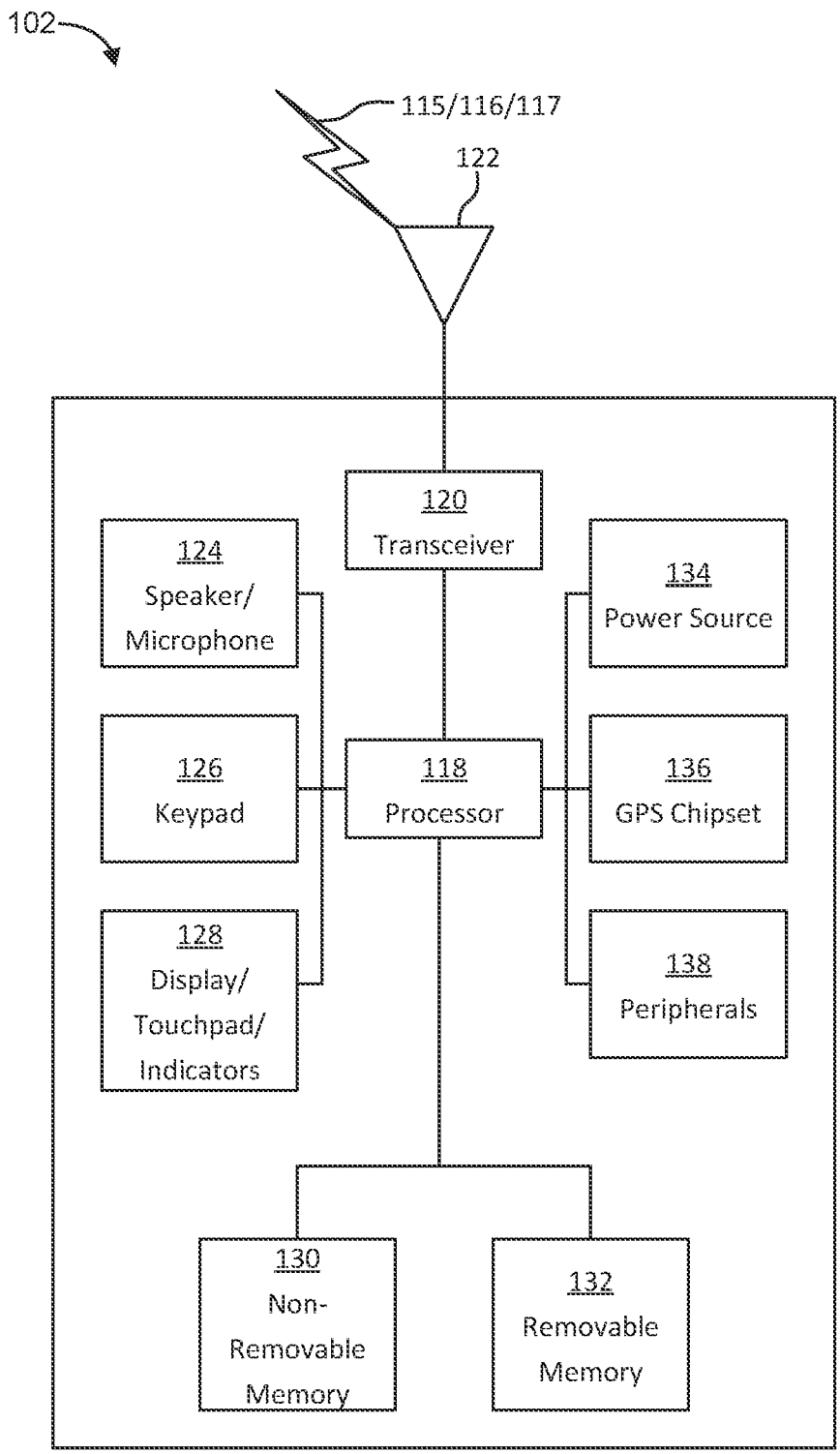
FIG. 27B is a block diagram of an example apparatus or device configured for wireless communications in accordance with the embodiments illustrated herein, such as for example, a wireless transmit/receive unit (WTRU)

FIG. 27B is a block diagram of an example apparatus or device configured for wireless communications in accordance with the embodiments illustrated herein, such as for example, a WTRU 102. As shown in FIG. 27B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114*a* and 114*b*, and/or the nodes that base stations 114*a* and 114*b* may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 27B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 27B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 27B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 27C:
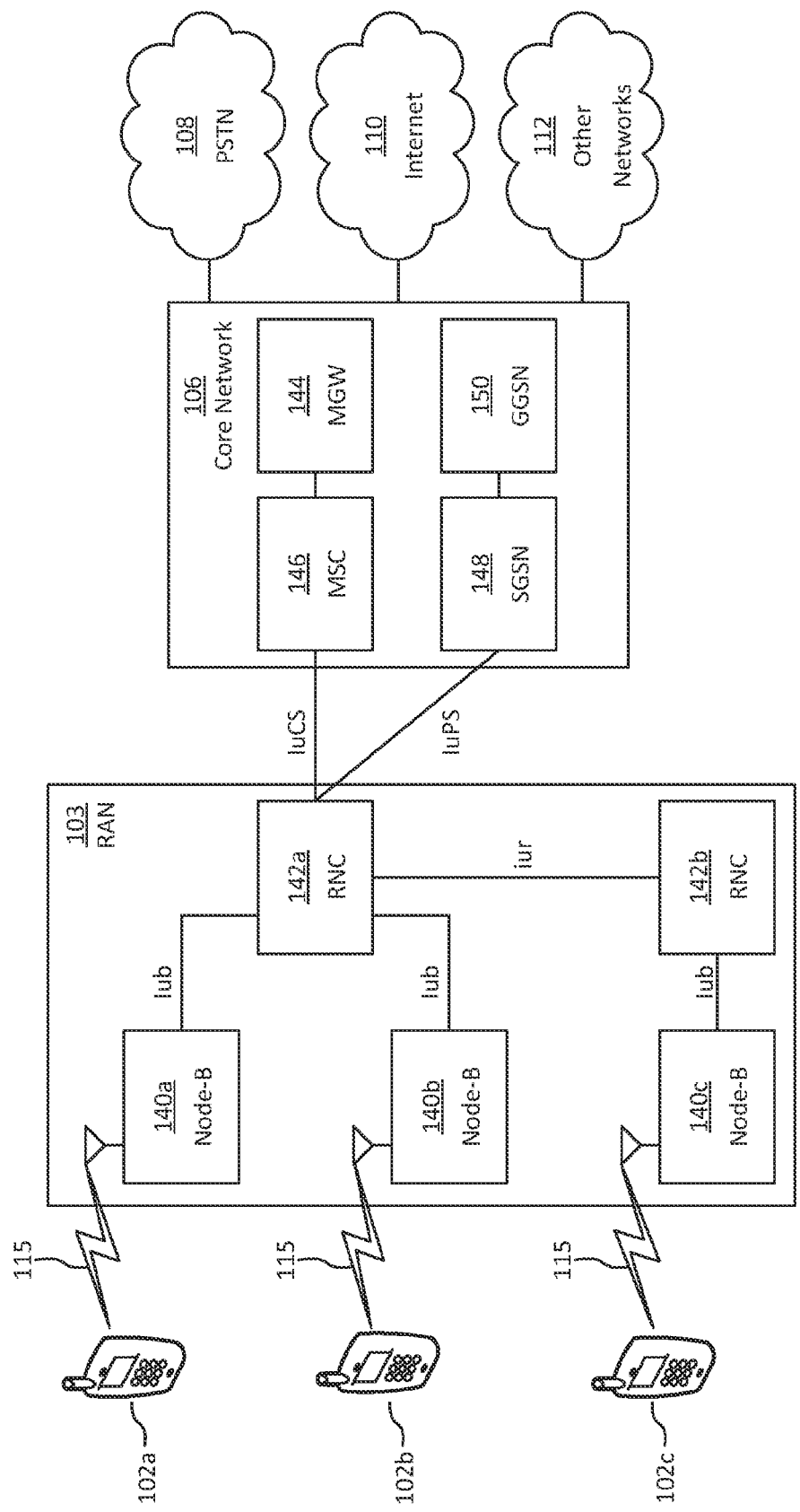
FIG. 27C is a system diagram of a RAN and a core network according to an embodiment.

FIG. 27C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 27C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 27C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 27C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 27D:
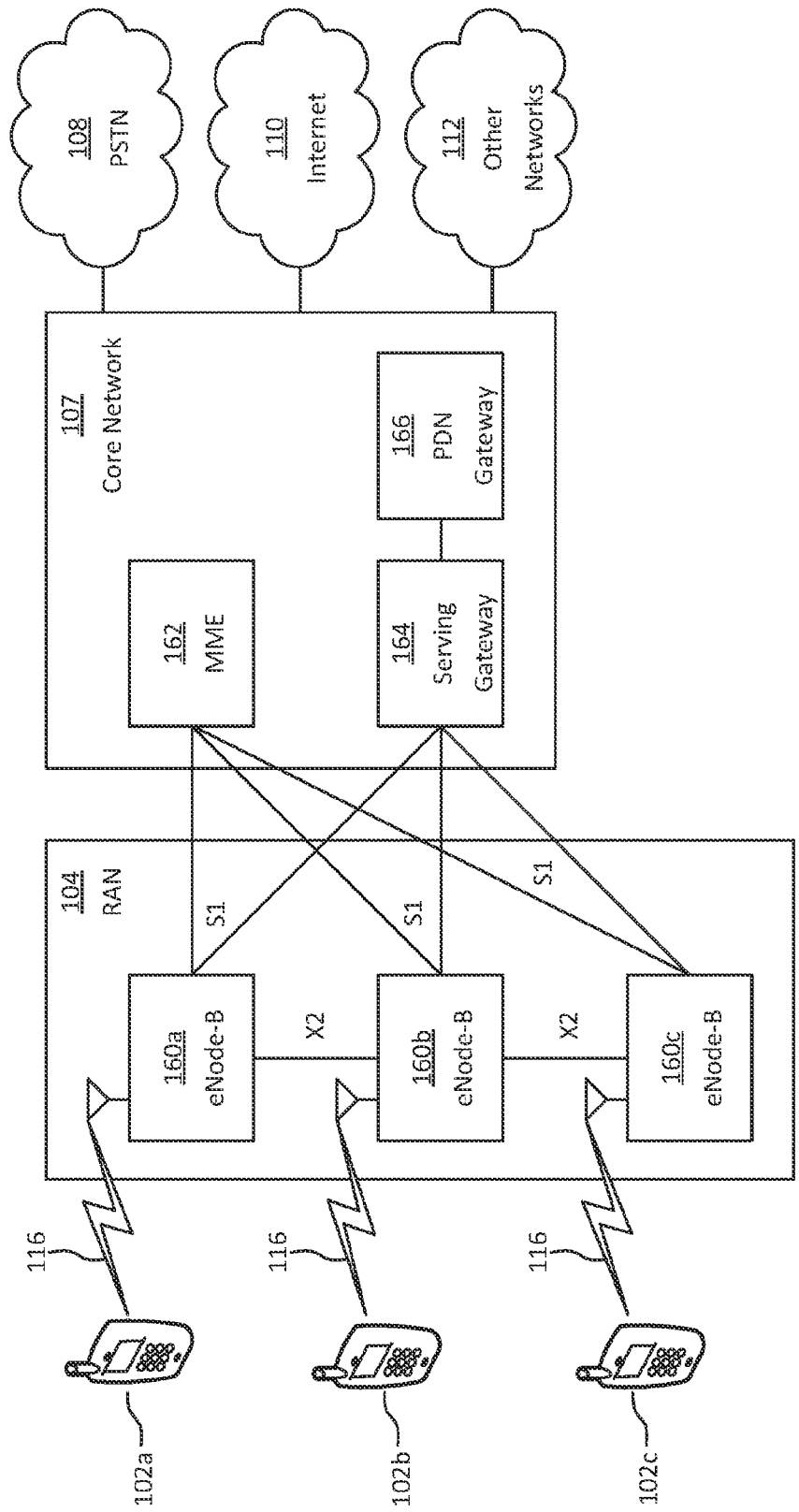
FIG. 27D is a system diagram of a RAN and a core network according to an embodiment.

FIG. 27D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 27D, the eNode-Bs 160a, 160b, 160c may communicate with one another over an X2 interface.

The core network 107 shown in FIG. 27D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 27E:
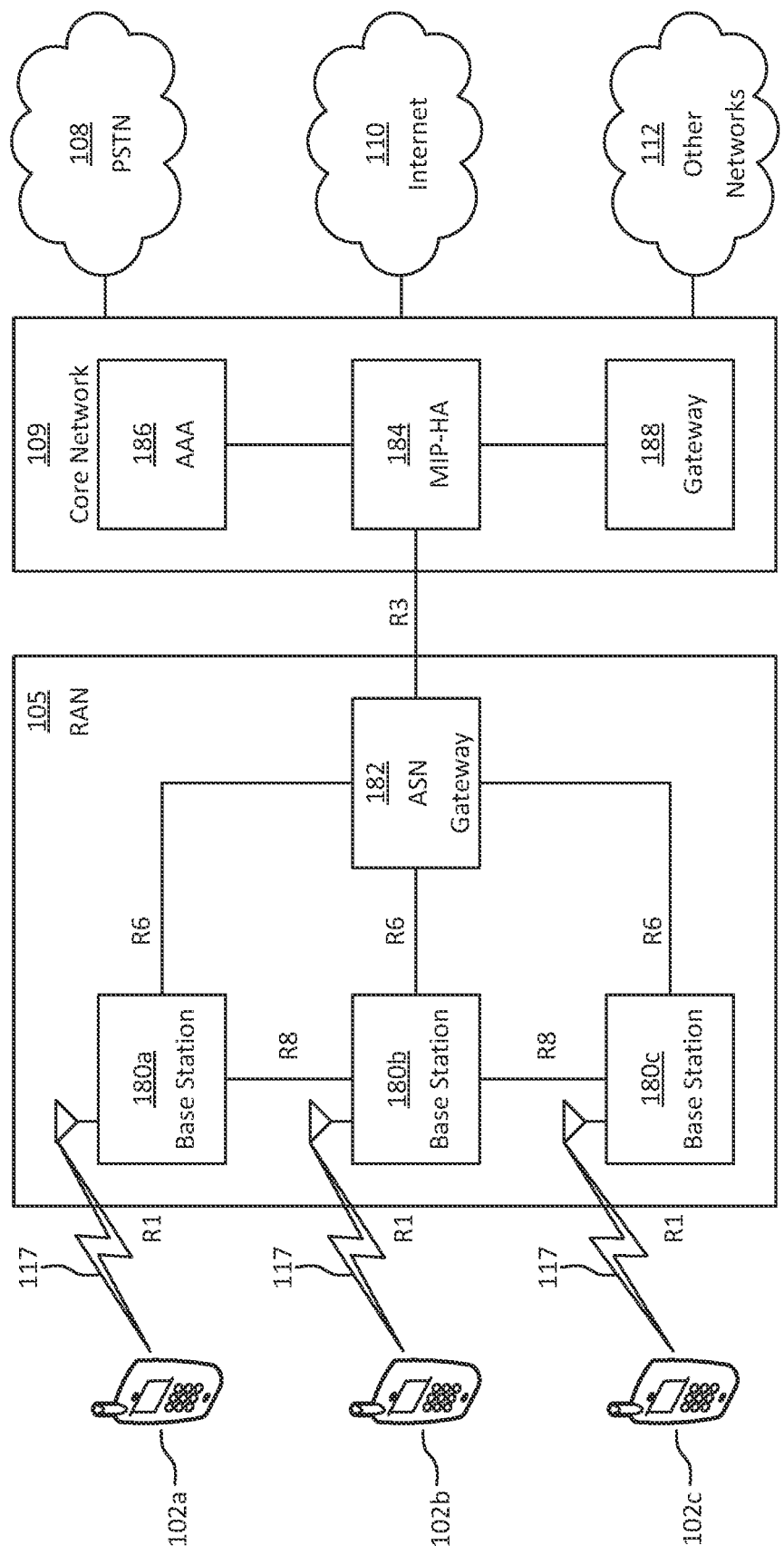
FIG. 27E is a system diagram of a RAN and the core network according to an embodiment.

FIG. 27E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 27E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 27E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 27E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 27A, 27C, 27D, and 27E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 27A, 27B, 27C, 27D, and 27E are provided by way of example only, and it is understood that the subject matter disclosed and claimed herein may be embodied or implemented in any similar communication system, whether presently defined or defined in the future.

Figure 27F:
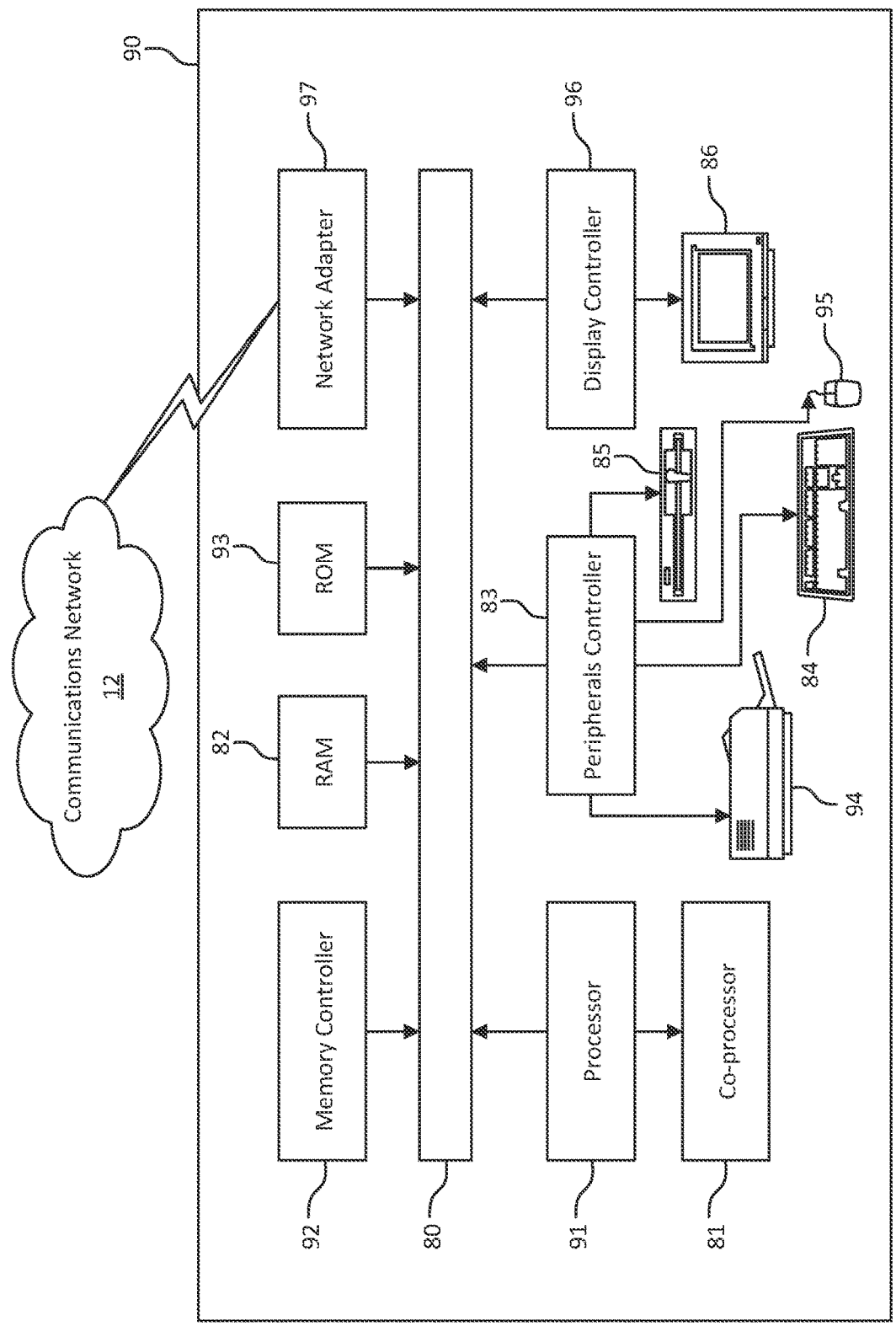
FIG. 27F is a block diagram of an exemplary computing system in which one or more apparatuses of the communications networks illustrated in FIGS. 27A, 27C, 27D and 27E may be embodied.

FIG. 27F is a block diagram of an exemplary computing system 90 in which one or more apparatuses of the communications networks illustrated in FIGS. 27A, 27C, 27D and 27E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 27A, 27B, 27C, 27D, and 27E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

Figure 27G:
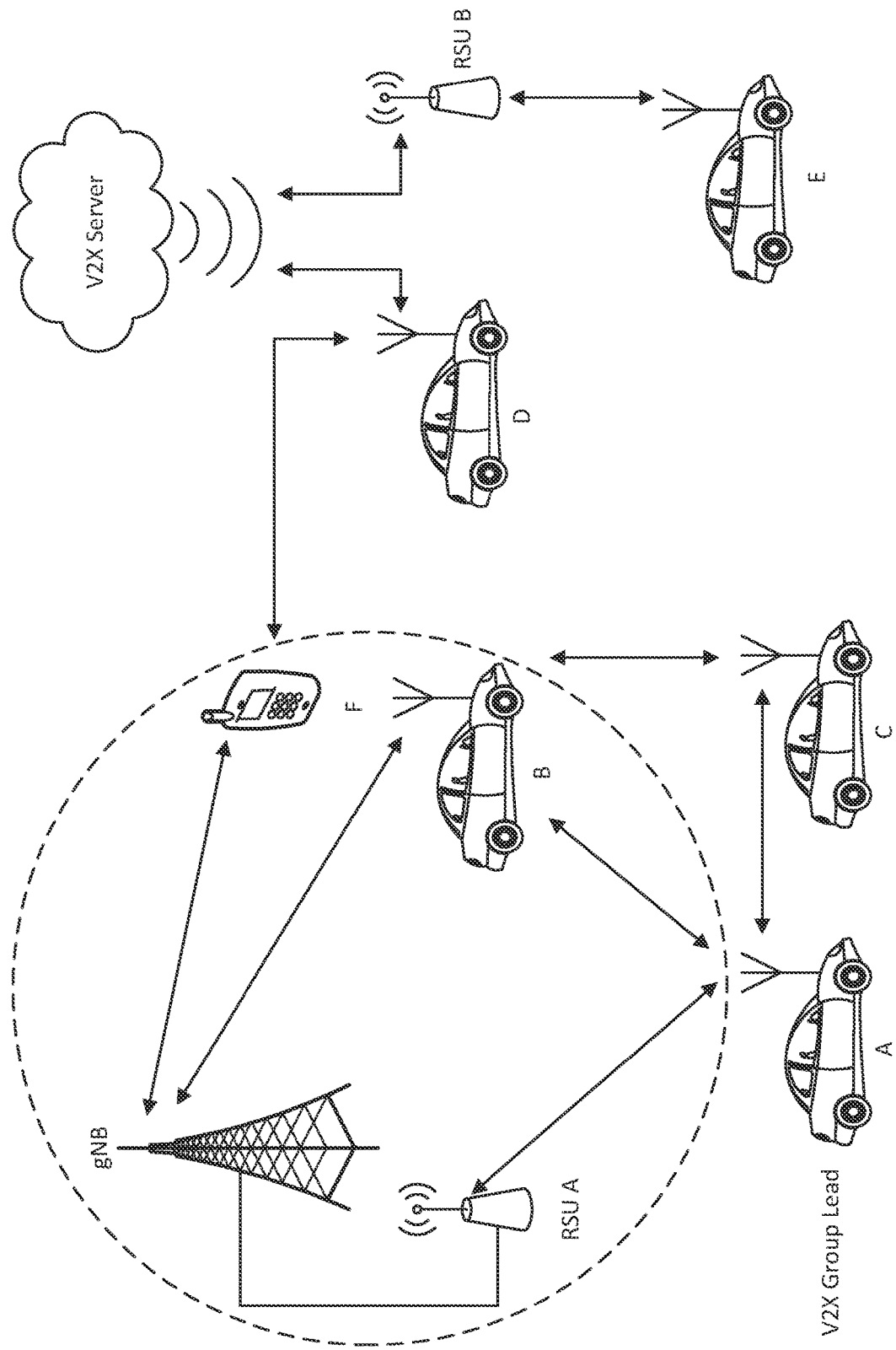
FIG. 27G illustrates one embodiment of an example communications system in which the methods and apparatuses described and claimed herein may be embodied.

FIG. 27G illustrates one embodiment of an example communications system 111 in which the methods and apparatuses described and claimed herein may be embodied. As shown, the example communications system 111 may include wireless transmit/receive units (WTRUs) A, B, C, D, E, F, a base station, a V2X server, and a RSUs A and B, though it will be appreciated that the disclosed embodiments contemplate any number of WTRUs, base stations, networks, and/or network elements. One or several or all WTRUs A, B, C, D, E can be out of range of the network (for example, in the figure out of the cell coverage boundary shown as the dash line). WTRUs A, B, C form a V2X group, among which WTRU A is the group lead and WTRUs B and C are group members. WTRUs A, B, C, D, E, F may communicate over Uu interface or Sidelink (PC5) interface.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computing system.

What is claimed is:

1. A wireless transmit/receive unit (WTRU), the WTRU comprising:
    a receiver configured to receive downlink information indicating one or more of: a first receive (RX) opportunity (RXOP), a first RX capability, a second RXOP, or a second RX capability;
    based on the downlink information, the WTRU further configured to establish one or more of: a first connection with a first network of a first subscriber identity module (SIM), or a second connection with a second network of a second SIM;
    the WTRU further configured to perform one or more of: a first reception from the first network or a second reception from the second network; and
    a transmitter configured to send, to the first network or second network, in response to a missed first RXOP or a missed second RXOP, an indication of adapted behavior of a Medium Access Control (MAC) layer interface.

2. The WTRU of claim 1, wherein the transmitter is further configured to:
    signal, to the first network, a first RX capability, or
    signal, to the second network, a second RX capability;
    wherein the first RX capability or the second RX capability indicate one or more of: a number or receivers for reception from the first network or the second network, a DownLink (DL) Multiple Input Multiple Output (MIMO) capability, a DL carrier aggregation (CA) capability, or a DL BandWidth part (BWP) operation capability.

3. The WTRU of claim 1, wherein a receiver or transmitter chain is shared across the first network and the second network.

4. The WTRU of claim 3, wherein the sharing of the receiver or transmitter chain is based on adapting one or more MAC counters or timers in response to the missed first RXOP or the missed second RXOP.

5. The WTRU of claim 1, wherein the indication provides information indicating a type of adapted behavior.

6. The WTRU of claim 5, wherein the type of adapted behavior comprises adapting one or more MAC counters in response to the missed first RXOP or the missed second RXOP, wherein the adapted one or more MAC counters are incremented to avoid declaring failure prematurely.

7. The WTRU of claim 5, wherein the type of adapted MAC behavior comprises:
    adapting one or more MAC timers in response to the missed first RXOP or the missed second RXOP, wherein the adapted one or more MAC timers are extended to avoid declaring failure prematurely.

8. The WTRU of claim 1, wherein the transmitter is further configured to send, to one or more upper layers, an indication of a reception failure when a number of RXOP misses exceeds a threshold.

9. The WTRU of claim 1, wherein the WTRU comprises a MAC layer comprising a common MAC layer interface and a dedicated MAC layer interface, wherein the dedicated MAC layer interface is associated with the first SIM or the second SIM and the common MAC layer interface is shared across both the first SIM and the second SIM.

10. A wireless transmit/receive unit (WTRU), the WTRU comprising:
    a receiver configured to receive uplink information indicating one or more of: a first transmit (TX) opportunity (TXOP) or a second TXOP;
    based on the uplink information, the WTRU further configured to establish one or more of: a first connection with a first network of a first subscriber identity module (SIM), or a second connection with a second network of a second SIM;

the WTRU further configured to perform one or more of:
a first transmission to the first network or a second transmission to the second network; and
a transmitter configured to send, to the first network or second network, in response to a missed first TXOP or a missed second TXOP, an indication of adapted behavior of a Medium Access Control (MAC) layer interface.

11. The WTRU of claim 10, wherein a receiver or transmitter chain is shared across the first network and the second network.

12. The WTRU of claim 11, wherein the sharing of the receiver or transmitter chain is based on adapting one or more MAC counters or timers in response to the missed first TXOP or the missed second TXOP.

13. The WTRU of claim 10, wherein the indication provides information indicating a type of adapted behavior.

14. The WTRU of claim 13, wherein the type of adapted behavior comprises adapting one or more MAC counters in response to the missed first TXOP or the missed second TXOP, wherein the adapted one or more MAC counters are incremented to avoid declaring failure prematurely.

15. The WTRU of claim 13, wherein the type of adapted behavior comprises:
adapting one or more MAC timers in response to the missed first TXOP or the missed second TXOP, wherein the adapted one or more MAC timers are extended to avoid declaring failure prematurely.

16. The WTRU of claim 13, wherein the type of adapted behavior comprises:
delaying performing a random access resource selection procedure until after a backoff time, wherein the backoff time is same or greater than a duration of time that a transmitter chain is busy.

17. The WTRU of claim 10, wherein the transmitter is further configured to send, to one or more upper layers, an indication of a transmission failure when a number of TXOP misses exceeds a threshold.

18. The WTRU of claim 10, wherein the WTRU comprises a MAC layer comprising a common MAC layer interface and a dedicated MAC layer interface, wherein the dedicated MAC layer interface is associated with the first SIM or the second SIM and the common MAC layer interface is shared across both the first SIM and the second SIM.

19. The WTRU of claim 1, wherein the transmitter is further configured to:
signal, to the first network, a first TX capability, or
signal, to the second network, a second TX capability;
wherein the first TX capability or the second TX capability indicate one or more of: a number of transmitters for transmission to the first network or the second network, an Uplink (UL) MIMO capability, an UL CA capability, an UL BWP operation capability, or a power budget allocated for transmission to the first network or second network.

20. A method for use in a wireless transmit/receive unit (WTRU), the method comprising:
receiving downlink information indicating one or more of: a first receive (RX) opportunity (RXOP) or a second RXOP;
receiving uplink information indicating one or more of: a first transmit (TX) opportunity (TXOP) or a second TXOP;
based on the downlink information or the uplink information, establishing one or more of: a first connection with a first network of a first subscriber identity module (SIM), or a second connection with a second network of a second SIM;
performing one or more of: a first reception from the first network, a first transmission to the first network, a second reception from the second network, or a second transmission to the second network; and
sending, to the first network or second network, in response to a missed first RXOP, a missed second RXOP, a missed first TXOP, or a missed second TXOP, an indication of adapted behavior of a Medium Access Control (MAC) layer interface.

\* \* \* \* \*